United States Patent
Zhang et al.

(10) Patent No.: US 12,401,820 B2
(45) Date of Patent: Aug. 26, 2025

(54) INTERACTION BETWEEN MERGE LIST CONSTRUCTION AND OTHER TOOLS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/181,886

(22) Filed: Mar. 10, 2023

(65) Prior Publication Data

US 2023/0209084 A1    Jun. 29, 2023

Related U.S. Application Data

(63) Continuation of application No. 17/480,184, filed on Sep. 21, 2021, now Pat. No. 11,641,483, which is a (Continued)

(51) Int. Cl.
*H04N 19/52*    (2014.01)
*H04N 19/159*   (2014.01)
*H04N 19/176*   (2014.01)

(52) U.S. Cl.
CPC ........... *H04N 19/52* (2014.11); *H04N 19/159* (2014.11); *H04N 19/176* (2014.11)

(58) Field of Classification Search
None
See application file for complete search history.

(56) References Cited

U.S. PATENT DOCUMENTS

| 7,023,922 B1 | 4/2006 | Xu |
| 7,653,134 B2 | 1/2010 | Xu |
| (Continued) | | |

FOREIGN PATENT DOCUMENTS

| AU | 2019293670 A1 | 1/2021 |
| AU | 2019293670 B2 | 6/2023 |
| (Continued) | | |

OTHER PUBLICATIONS

US 11,057,620 B2, 07/2021, Li (withdrawn)
(Continued)

*Primary Examiner* — Lindsay J Uhl
(74) *Attorney, Agent, or Firm* — Conley Rose, P.C.

(57) ABSTRACT

Device, methods, and systems that enable the interaction of merge list construction with other tools and methods in video coding are described. An exemplary method for video processing includes determining, based on a first threshold, a maximum number of history-based motion vector prediction (HMVP) candidates to be checked in a table, making a decision regarding a selective checking of a number of the HMVP candidates in an order, the number of the HMVP candidates checked not exceeding the maximum number of HMVP candidates, constructing, based on the decision, a motion candidates list, and performing, based on the motion candidates list, a conversion between a current block and a bitstream representation of the current block.

20 Claims, 29 Drawing Sheets

2700

Determining, based on a first threshold (T1), a maximum number of history-based motion vector prediction (HMVP) candidates to be checked in a table — 2710

Making a decision regarding a selective checking of a number of the HMVP candidates in an order, the number of the HMVP candidates checked not exceeding the maximum number of HMVP candidates — 2720

Constructing, based on the decision, a motion candidates list — 2730

Performing, based on the motion candidates list, a conversion between a current block and a bitstream representation of the current block — 2740

Related U.S. Application Data continuation of application No. PCT/CN2020/080597, filed on Mar. 23, 2020.

(60) Provisional application No. 62/822,438, filed on Mar. 22, 2019.

(56) References Cited

U.S. PATENT DOCUMENTS

| | | | |
|---|---|---|---|
| 7,675,976 B2 | 3/2010 | Xu | |
| 7,680,189 B2 | 3/2010 | Xu | |
| 7,680,190 B2 | 3/2010 | Xu | |
| 7,801,220 B2 | 9/2010 | Zhang | |
| 8,804,816 B2 | 8/2014 | Li | |
| 9,350,970 B2 | 5/2016 | Kang | |
| 9,445,076 B2 | 9/2016 | Zhang | |
| 9,485,503 B2 | 11/2016 | Zhang | |
| 9,503,702 B2 | 11/2016 | Chen | |
| 9,621,888 B2 | 4/2017 | Jeon | |
| 9,667,996 B2 | 5/2017 | Chen | |
| 9,699,450 B2 | 7/2017 | Zhang | |
| 9,762,882 B2 | 9/2017 | Zhang | |
| 9,762,900 B2 | 9/2017 | Park | |
| 9,807,431 B2 | 10/2017 | Hannuksela | |
| 9,872,016 B2 | 1/2018 | Chuang | |
| 9,900,615 B2 | 2/2018 | Li | |
| 9,918,102 B1 | 3/2018 | Kohn | |
| 9,967,592 B2 | 5/2018 | Zhang | |
| 9,998,727 B2 | 6/2018 | Zhang | |
| 10,021,414 B2 | 7/2018 | Seregin | |
| 10,085,041 B2 | 9/2018 | Zhang | |
| 10,116,934 B2 | 10/2018 | Zan | |
| 10,154,286 B2 | 12/2018 | He | |
| 10,158,876 B2 | 12/2018 | Chen | |
| 10,200,709 B2 | 2/2019 | Chen | |
| 10,200,711 B2 | 2/2019 | Li | |
| 10,230,980 B2 | 3/2019 | Liu | |
| 10,271,064 B2 | 4/2019 | Chien | |
| 10,277,909 B2 | 4/2019 | Ye | |
| 10,284,869 B2 | 5/2019 | Han | |
| 10,306,225 B2 | 5/2019 | Zhang | |
| 10,349,083 B2 | 7/2019 | Chen | |
| 10,362,330 B1 | 7/2019 | Li | |
| 10,368,072 B2 | 7/2019 | Zhang | |
| 10,390,029 B2 | 8/2019 | Ye | |
| 10,440,378 B1 | 10/2019 | Xu | |
| 10,448,010 B2 | 10/2019 | Chen | |
| 10,462,439 B2 | 10/2019 | He | |
| 10,491,902 B1 | 11/2019 | Xu | |
| 10,491,917 B2 | 11/2019 | Chen | |
| 10,531,118 B2 | 1/2020 | Li | |
| 10,560,718 B2 | 2/2020 | Lee | |
| 10,595,035 B2 | 3/2020 | Karczewicz | |
| 10,681,383 B2 | 6/2020 | Ye | |
| 10,687,077 B2 | 6/2020 | Zhang | |
| 10,694,204 B2 | 6/2020 | Chen | |
| 10,701,366 B2 | 6/2020 | Chen | |
| 10,771,811 B2 | 9/2020 | Liu | |
| 10,778,997 B2 | 9/2020 | Zhang | |
| 10,778,999 B2 | 9/2020 | Li | |
| 10,805,650 B2 | 10/2020 | Wang | |
| 10,812,791 B2 | 10/2020 | Chien | |
| 10,841,615 B2 | 11/2020 | He | |
| 10,873,756 B2 | 12/2020 | Zhang | |
| 10,911,769 B2 | 2/2021 | Zhang | |
| 11,128,887 B2 | 9/2021 | Lee | |
| 11,134,243 B2 | 9/2021 | Zhang | |
| 11,134,244 B2 | 9/2021 | Zhang | |
| 11,134,267 B2 | 9/2021 | Zhang | |
| 11,140,383 B2 | 10/2021 | Zhang | |
| 11,140,385 B2 | 10/2021 | Zhang | |
| 11,146,785 B2 | 10/2021 | Zhang | |
| 11,146,786 B2 | 10/2021 | Zhang | |
| 11,153,557 B2 | 10/2021 | Zhang | |
| 11,153,558 B2 | 10/2021 | Zhang | |
| 11,153,559 B2 | 10/2021 | Zhang | |
| 11,159,787 B2 | 10/2021 | Zhang | |
| 11,159,807 B2 | 10/2021 | Zhang | |
| 11,159,817 B2 | 10/2021 | Zhang | |
| 11,245,892 B2 | 2/2022 | Zhang | |
| 11,412,211 B2 | 8/2022 | Lee | |
| 11,463,685 B2 | 10/2022 | Zhang | |
| 11,528,500 B2 | 12/2022 | Zhang et al. | |
| 11,528,501 B2 | 12/2022 | Zhang | |
| 11,589,071 B2 | 2/2023 | Zhang et al. | |
| 11,641,483 B2 * | 5/2023 | Zhang | H04N 19/159 375/240.16 |
| 11,695,921 B2 | 7/2023 | Zhang et al. | |
| 11,706,406 B2 | 7/2023 | Zhang et al. | |
| 11,877,002 B2 | 1/2024 | Zhang et al. | |
| 11,895,318 B2 | 2/2024 | Zhang et al. | |
| 11,909,951 B2 | 2/2024 | Zhang et al. | |
| 11,909,989 B2 | 2/2024 | Zhang et al. | |
| 11,956,464 B2 | 4/2024 | Zhang et al. | |
| 11,997,253 B2 | 5/2024 | Zhang | |
| 12,034,914 B2 | 7/2024 | Zhang | |
| 12,058,364 B2 | 8/2024 | Zhang | |
| 12,167,018 B2 | 12/2024 | Zhang et al. | |
| 2005/0105812 A1 | 5/2005 | Molino | |
| 2006/0233243 A1 | 10/2006 | Ridge | |
| 2007/0025444 A1 | 2/2007 | Okada | |
| 2009/0180538 A1 | 7/2009 | Visharam | |
| 2010/0080296 A1 | 4/2010 | Lee | |
| 2011/0109964 A1 | 5/2011 | Kim | |
| 2011/0116546 A1 | 5/2011 | Guo | |
| 2011/0170600 A1 | 7/2011 | Ishikawa | |
| 2011/0194608 A1 | 8/2011 | Rusert | |
| 2011/0194609 A1 | 8/2011 | Rusert | |
| 2011/0200107 A1 | 8/2011 | Ryu | |
| 2012/0082229 A1 | 4/2012 | Su | |
| 2012/0134415 A1 | 5/2012 | Lin | |
| 2012/0195366 A1 | 8/2012 | Liu | |
| 2012/0195368 A1 | 8/2012 | Chien | |
| 2012/0257678 A1 | 10/2012 | Zhou | |
| 2012/0263231 A1 | 10/2012 | Zhou | |
| 2012/0287999 A1 | 11/2012 | Li | |
| 2012/0300846 A1 | 11/2012 | Sugio | |
| 2012/0307903 A1 | 12/2012 | Sugio | |
| 2012/0320984 A1 | 12/2012 | Zhou | |
| 2013/0064301 A1 | 3/2013 | Guo | |
| 2013/0070855 A1 | 3/2013 | Zheng | |
| 2013/0094580 A1 | 4/2013 | Zhou | |
| 2013/0101041 A1 | 4/2013 | Fishwick | |
| 2013/0114717 A1 | 5/2013 | Zheng | |
| 2013/0114723 A1 | 5/2013 | Bici | |
| 2013/0128982 A1 | 5/2013 | Kim | |
| 2013/0163668 A1 | 6/2013 | Chen | |
| 2013/0188013 A1 | 7/2013 | Chen | |
| 2013/0188715 A1 | 7/2013 | Seregin | |
| 2013/0208799 A1 | 8/2013 | Srinivasamurthy | |
| 2013/0243093 A1 | 9/2013 | Chen | |
| 2013/0265388 A1 | 10/2013 | Zhang | |
| 2013/0272377 A1 | 10/2013 | Karczewicz | |
| 2013/0272410 A1 | 10/2013 | Seregin | |
| 2013/0272412 A1 | 10/2013 | Seregin | |
| 2013/0272413 A1 | 10/2013 | Seregin | |
| 2013/0294513 A1 | 11/2013 | Seregin et al. | |
| 2013/0301734 A1 | 11/2013 | Gisquet | |
| 2013/0336406 A1 | 12/2013 | Zhang | |
| 2014/0049605 A1 | 2/2014 | Chen | |
| 2014/0064372 A1 | 3/2014 | Laroche | |
| 2014/0078251 A1 | 3/2014 | Kang | |
| 2014/0086327 A1 | 3/2014 | Ugur | |
| 2014/0105295 A1 | 4/2014 | Shiodera | |
| 2014/0105302 A1 | 4/2014 | Takehara | |
| 2014/0126629 A1 | 5/2014 | Park | |
| 2014/0133558 A1 | 5/2014 | Seregin | |
| 2014/0161186 A1 | 6/2014 | Zhang | |
| 2014/0185685 A1 | 7/2014 | Asaka | |
| 2014/0219356 A1 | 8/2014 | Nishitani | |
| 2014/0241434 A1 | 8/2014 | Lin | |
| 2014/0286427 A1 | 9/2014 | Fukushima | |
| 2014/0286433 A1 | 9/2014 | He | |
| 2014/0321547 A1 | 10/2014 | Takehara | |
| 2014/0334557 A1 | 11/2014 | Schierl | |

(56) References Cited

U.S. PATENT DOCUMENTS

| | | |
|---|---|---|
| 2014/0341289 A1 | 11/2014 | Schwarz |
| 2014/0355685 A1 | 12/2014 | Chen |
| 2014/0376614 A1 | 12/2014 | Fukushima |
| 2014/0376626 A1 | 12/2014 | Lee |
| 2014/0376638 A1 | 12/2014 | Nakamura |
| 2015/0063464 A1 | 3/2015 | Chen |
| 2015/0085932 A1 | 3/2015 | Lin |
| 2015/0110197 A1 | 4/2015 | Kim |
| 2015/0189313 A1 | 7/2015 | Shimada |
| 2015/0195558 A1 | 7/2015 | Kim |
| 2015/0237370 A1 | 8/2015 | Zhou |
| 2015/0256853 A1 | 9/2015 | Li |
| 2015/0264386 A1 | 9/2015 | Pang |
| 2015/0281733 A1 | 10/2015 | Fu |
| 2015/0312588 A1 | 10/2015 | Yamamoto |
| 2015/0326880 A1 | 11/2015 | He |
| 2015/0341635 A1 | 11/2015 | Seregin |
| 2015/0358635 A1 | 12/2015 | Xiu |
| 2016/0044332 A1 | 2/2016 | Maaninen |
| 2016/0050430 A1 | 2/2016 | Xiu |
| 2016/0105670 A1 | 4/2016 | Pang et al. |
| 2016/0219278 A1 | 7/2016 | Chen |
| 2016/0227214 A1 | 8/2016 | Rapaka |
| 2016/0234492 A1 | 8/2016 | Li |
| 2016/0241867 A1 | 8/2016 | Sugio |
| 2016/0269753 A1 | 9/2016 | Tsai |
| 2016/0277761 A1 | 9/2016 | Li |
| 2016/0286230 A1 | 9/2016 | Li |
| 2016/0286232 A1 | 9/2016 | Li |
| 2016/0295240 A1 | 10/2016 | Kim |
| 2016/0301936 A1 | 10/2016 | Chen |
| 2016/0330471 A1 | 11/2016 | Zhu |
| 2016/0330474 A1 | 11/2016 | Liu |
| 2016/0337661 A1 | 11/2016 | Pang |
| 2016/0366416 A1 | 12/2016 | Liu |
| 2016/0366442 A1 | 12/2016 | Liu |
| 2016/0373784 A1 | 12/2016 | Bang |
| 2016/0381374 A1 | 12/2016 | Bang |
| 2017/0006302 A1 | 1/2017 | Lee |
| 2017/0013269 A1 | 1/2017 | Kim |
| 2017/0048550 A1 | 2/2017 | Hannuksela |
| 2017/0054995 A1 | 2/2017 | Kim |
| 2017/0054996 A1 | 2/2017 | Xu |
| 2017/0078699 A1 | 3/2017 | Park |
| 2017/0099495 A1 | 4/2017 | Rapaka |
| 2017/0127082 A1 | 5/2017 | Chen |
| 2017/0127086 A1 | 5/2017 | Lai |
| 2017/0150168 A1 | 5/2017 | Nakamura |
| 2017/0163999 A1 | 6/2017 | Li |
| 2017/0188045 A1 | 6/2017 | Zhou |
| 2017/0214932 A1 | 7/2017 | Huang |
| 2017/0223352 A1 | 8/2017 | Kim |
| 2017/0238005 A1 | 8/2017 | Chien |
| 2017/0238011 A1 | 8/2017 | Pettersson |
| 2017/0264895 A1 | 9/2017 | Takehara |
| 2017/0272746 A1 | 9/2017 | Sugio |
| 2017/0280159 A1 | 9/2017 | Xu |
| 2017/0289570 A1 | 10/2017 | Zhou |
| 2017/0332084 A1 | 11/2017 | Seregin |
| 2017/0332095 A1 | 11/2017 | Zou |
| 2017/0332099 A1 | 11/2017 | Lee |
| 2017/0339425 A1 | 11/2017 | Jeong |
| 2018/0014017 A1 | 1/2018 | Li |
| 2018/0041769 A1 | 2/2018 | Chuang |
| 2018/0070100 A1 | 3/2018 | Chen |
| 2018/0077417 A1 | 3/2018 | Huang |
| 2018/0084260 A1 | 3/2018 | Chien |
| 2018/0098063 A1 | 4/2018 | Chen |
| 2018/0124398 A1 | 5/2018 | Park |
| 2018/0184085 A1 | 6/2018 | Yang |
| 2018/0192069 A1 | 7/2018 | Chen |
| 2018/0192071 A1 | 7/2018 | Chuang |
| 2018/0242024 A1 | 8/2018 | Chen |
| 2018/0262753 A1 | 9/2018 | Sugio |
| 2018/0270500 A1 | 9/2018 | Li et al. |
| 2018/0278949 A1 | 9/2018 | Karczewicz |
| 2018/0310018 A1 | 10/2018 | Guo |
| 2018/0332284 A1 | 11/2018 | Liu |
| 2018/0332312 A1 | 11/2018 | Liu |
| 2018/0343467 A1 | 11/2018 | Lin |
| 2018/0352223 A1 | 12/2018 | Chen |
| 2018/0352247 A1 | 12/2018 | Park |
| 2018/0352256 A1 | 12/2018 | Bang |
| 2018/0359483 A1 | 12/2018 | Chen |
| 2018/0376149 A1 | 12/2018 | Zhang |
| 2018/0376160 A1 | 12/2018 | Zhang |
| 2018/0376164 A1 | 12/2018 | Zhang |
| 2019/0098329 A1 | 3/2019 | Han |
| 2019/0116374 A1 | 4/2019 | Zhang |
| 2019/0116381 A1 | 4/2019 | Lee |
| 2019/0141334 A1 | 5/2019 | Lim |
| 2019/0158827 A1 | 5/2019 | Sim |
| 2019/0158866 A1 | 5/2019 | Kim |
| 2019/0200040 A1 | 6/2019 | Lim |
| 2019/0215529 A1 | 7/2019 | Laroche |
| 2019/0222848 A1 | 7/2019 | Chen |
| 2019/0222865 A1 | 7/2019 | Zhang |
| 2019/0230362 A1 | 7/2019 | Chen |
| 2019/0230376 A1 | 7/2019 | Hu |
| 2019/0293670 A1 | 9/2019 | Mueller |
| 2019/0297325 A1 | 9/2019 | Lim |
| 2019/0297343 A1 | 9/2019 | Seo |
| 2019/0320180 A1 | 10/2019 | Yu |
| 2019/0342557 A1 | 11/2019 | Robert |
| 2019/0356925 A1 | 11/2019 | Ye |
| 2020/0014948 A1 | 1/2020 | Lai |
| 2020/0021839 A1 | 1/2020 | Pham Van |
| 2020/0021845 A1 | 1/2020 | Lin |
| 2020/0029088 A1 | 1/2020 | Xu |
| 2020/0036997 A1 | 1/2020 | Li |
| 2020/0077106 A1 | 3/2020 | Jhu |
| 2020/0077116 A1 | 3/2020 | Lee |
| 2020/0099951 A1 | 3/2020 | Hung |
| 2020/0112715 A1* | 4/2020 | Hung ............ H04N 19/433 |
| 2020/0112741 A1 | 4/2020 | Han |
| 2020/0120334 A1 | 4/2020 | Xu |
| 2020/0128238 A1 | 4/2020 | Lee |
| 2020/0128266 A1 | 4/2020 | Xu |
| 2020/0145690 A1 | 5/2020 | Li |
| 2020/0154124 A1 | 5/2020 | Lee |
| 2020/0169726 A1 | 5/2020 | Kim |
| 2020/0169745 A1 | 5/2020 | Han |
| 2020/0169748 A1 | 5/2020 | Chen |
| 2020/0177873 A1 | 6/2020 | Li |
| 2020/0186793 A1 | 6/2020 | Racape |
| 2020/0186820 A1* | 6/2020 | Park ............ H04N 19/176 |
| 2020/0195920 A1 | 6/2020 | Racape |
| 2020/0195959 A1 | 6/2020 | Zhang |
| 2020/0195960 A1 | 6/2020 | Zhang |
| 2020/0204820 A1 | 6/2020 | Zhang |
| 2020/0221108 A1 | 7/2020 | Xu |
| 2020/0228815 A1 | 7/2020 | Xu |
| 2020/0228825 A1 | 7/2020 | Lim |
| 2020/0236353 A1 | 7/2020 | Zhang |
| 2020/0244954 A1 | 7/2020 | Heo |
| 2020/0244979 A1 | 7/2020 | Li |
| 2020/0267408 A1 | 8/2020 | Lee |
| 2020/0275124 A1 | 8/2020 | Ko |
| 2020/0280733 A1 | 9/2020 | Li |
| 2020/0280735 A1 | 9/2020 | Lim |
| 2020/0280736 A1 | 9/2020 | Wang |
| 2020/0288150 A1 | 9/2020 | Jun |
| 2020/0288157 A1 | 9/2020 | Li |
| 2020/0288168 A1 | 9/2020 | Zhang |
| 2020/0296411 A1 | 9/2020 | Li |
| 2020/0296414 A1 | 9/2020 | Park |
| 2020/0304805 A1 | 9/2020 | Li |
| 2020/0322628 A1 | 10/2020 | Lee |
| 2020/0336726 A1 | 10/2020 | Wang |
| 2020/0359049 A1* | 11/2020 | Zhao ............ H04N 19/52 |
| 2020/0366923 A1 | 11/2020 | Zhang |
| 2020/0374542 A1 | 11/2020 | Zhang |
| 2020/0374543 A1 | 11/2020 | Liu |
| 2020/0374544 A1 | 11/2020 | Liu |

(56) References Cited

U.S. PATENT DOCUMENTS

| | | | |
|---|---|---|---|
| 2020/0382770 A1 | 12/2020 | Zhang | |
| 2020/0396446 A1 | 12/2020 | Zhang | |
| 2020/0396447 A1 | 12/2020 | Zhang | |
| 2020/0396462 A1 | 12/2020 | Zhang | |
| 2020/0396466 A1 | 12/2020 | Zhang et al. | |
| 2020/0404253 A1 | 12/2020 | Chen | |
| 2020/0404254 A1 | 12/2020 | Zhao | |
| 2020/0404285 A1 | 12/2020 | Zhang | |
| 2020/0404305 A1 | 12/2020 | Ye | |
| 2020/0404306 A1 | 12/2020 | Auyeung | |
| 2020/0404316 A1 | 12/2020 | Zhang | |
| 2020/0404319 A1 | 12/2020 | Zhang | |
| 2020/0404320 A1 | 12/2020 | Zhang | |
| 2020/0413038 A1 | 12/2020 | Zhang | |
| 2020/0413044 A1 | 12/2020 | Zhang | |
| 2020/0413045 A1 | 12/2020 | Zhang | |
| 2021/0006787 A1 | 1/2021 | Zhang | |
| 2021/0006788 A1 | 1/2021 | Zhang | |
| 2021/0006790 A1 | 1/2021 | Zhang | |
| 2021/0006819 A1 | 1/2021 | Zhang | |
| 2021/0006823 A1 | 1/2021 | Zhang | |
| 2021/0014520 A1 | 1/2021 | Zhang | |
| 2021/0014525 A1 | 1/2021 | Zhang | |
| 2021/0021856 A1 | 1/2021 | Zheng | |
| 2021/0029351 A1 | 1/2021 | Zhang | |
| 2021/0029352 A1 | 1/2021 | Zhang | |
| 2021/0029362 A1 | 1/2021 | Liu | |
| 2021/0029366 A1 | 1/2021 | Zhang | |
| 2021/0029372 A1 | 1/2021 | Zhang | |
| 2021/0029374 A1 | 1/2021 | Zhang | |
| 2021/0051324 A1 | 2/2021 | Zhang | |
| 2021/0051339 A1 | 2/2021 | Liu | |
| 2021/0067783 A1 | 3/2021 | Liu | |
| 2021/0076063 A1 | 3/2021 | Liu | |
| 2021/0092357 A1 | 3/2021 | Wang | |
| 2021/0092379 A1 | 3/2021 | Zhang | |
| 2021/0092436 A1 | 3/2021 | Zhang | |
| 2021/0105482 A1 | 4/2021 | Zhang | |
| 2021/0120234 A1 | 4/2021 | Zhang | |
| 2021/0168368 A1 | 6/2021 | Xu | |
| 2021/0185326 A1 | 6/2021 | Wang | |
| 2021/0203984 A1 | 7/2021 | Salehifar | |
| 2021/0235108 A1 | 7/2021 | Zhang | |
| 2021/0243476 A1 | 8/2021 | Ko | |
| 2021/0258569 A1* | 8/2021 | Chen | H04N 19/196 |
| 2021/0297659 A1 | 9/2021 | Zhang | |
| 2021/0314560 A1 | 10/2021 | Lai | |
| 2021/0321089 A1 | 10/2021 | Lin | |
| 2021/0329292 A1 | 10/2021 | Jeong | |
| 2021/0337216 A1 | 10/2021 | Zhang | |
| 2021/0344947 A1 | 11/2021 | Zhang et al. | |
| 2021/0352312 A1 | 11/2021 | Zhang | |
| 2021/0360230 A1 | 11/2021 | Zhang | |
| 2021/0360277 A1 | 11/2021 | Jeong | |
| 2021/0360278 A1 | 11/2021 | Zhang et al. | |
| 2021/0368180 A1 | 11/2021 | Park | |
| 2021/0377518 A1 | 12/2021 | Zhang | |
| 2021/0377545 A1 | 12/2021 | Zhang | |
| 2021/0377558 A1 | 12/2021 | Xiu | |
| 2021/0400298 A1 | 12/2021 | Zhao | |
| 2022/0007047 A1 | 1/2022 | Zhang et al. | |
| 2022/0021900 A1 | 1/2022 | Jeong | |
| 2022/0094915 A1 | 3/2022 | Zhang | |
| 2022/0094967 A1 | 3/2022 | Zhang | |
| 2022/0385887 A1 | 12/2022 | Jun | |
| 2022/0417551 A1 | 12/2022 | Lim | |

FOREIGN PATENT DOCUMENTS

| | | |
|---|---|---|
| BR | 112020024142 A2 | 3/2021 |
| BR | 112020024202-0 B1 | 12/2024 |
| BR | 112020241628 B1 | 1/2025 |
| CA | 3020265 A1 | 11/2017 |
| CA | 3101730 C | 10/2024 |
| CN | 1898715 A | 1/2007 |
| CN | 1925614 A | 3/2007 |
| CN | 101193302 A | 6/2008 |
| CN | 101933328 A | 12/2010 |
| CN | 102474619 A | 5/2012 |
| CN | 102860006 A | 1/2013 |
| CN | 102907098 A | 1/2013 |
| CN | 102946536 A | 2/2013 |
| CN | 103004204 A | 3/2013 |
| CN | 103096071 A | 5/2013 |
| CN | 103096073 A | 5/2013 |
| CN | 103098467 A | 5/2013 |
| CN | 103339938 A | 10/2013 |
| CN | 103370937 A | 10/2013 |
| CN | 103404143 A | 11/2013 |
| CN | 103444182 A | 12/2013 |
| CN | 103518374 A | 1/2014 |
| CN | 103535039 A | 1/2014 |
| CN | 103535040 A | 1/2014 |
| CN | 103609123 A | 2/2014 |
| CN | 103797799 A | 5/2014 |
| CN | 103828364 A | 5/2014 |
| CN | 103858428 A | 6/2014 |
| CN | 103891281 A | 6/2014 |
| CN | 103931192 A | 7/2014 |
| CN | 104041042 A | 9/2014 |
| CN | 104054350 A | 9/2014 |
| CN | 104079944 A | 10/2014 |
| CN | 104126302 A | 10/2014 |
| CN | 104247434 A | 12/2014 |
| CN | 104272743 A | 1/2015 |
| CN | 104350749 A | 2/2015 |
| CN | 104365102 A | 2/2015 |
| CN | 104396248 A | 3/2015 |
| CN | 104539950 A | 4/2015 |
| CN | 104584549 A | 4/2015 |
| CN | 104662909 A | 5/2015 |
| CN | 104756499 A | 7/2015 |
| CN | 104796724 A | 7/2015 |
| CN | 102946536 B | 9/2015 |
| CN | 104915966 A | 9/2015 |
| CN | 105245900 A | 1/2016 |
| CN | 105324996 A | 2/2016 |
| CN | 105556971 A | 5/2016 |
| CN | 105681807 A | 6/2016 |
| CN | 105917650 A | 8/2016 |
| CN | 106464864 A | 2/2017 |
| CN | 106471806 A | 3/2017 |
| CN | 106716997 A | 5/2017 |
| CN | 106797477 A | 5/2017 |
| CN | 106851046 A | 6/2017 |
| CN | 106851267 A | 6/2017 |
| CN | 106851269 A | 6/2017 |
| CN | 107071458 A | 8/2017 |
| CN | 107079161 A | 8/2017 |
| CN | 107079162 A | 8/2017 |
| CN | 107087165 A | 8/2017 |
| CN | 107113424 A | 8/2017 |
| CN | 107113442 A | 8/2017 |
| CN | 107113446 A | 8/2017 |
| CN | 107197301 A | 9/2017 |
| CN | 107211156 A | 9/2017 |
| CN | 107295348 A | 10/2017 |
| CN | 107347159 A | 11/2017 |
| CN | 107431820 A | 12/2017 |
| CN | 107493473 A | 12/2017 |
| CN | 107592529 A | 1/2018 |
| CN | 107690809 A | 2/2018 |
| CN | 107690810 A | 2/2018 |
| CN | 107710764 A | 2/2018 |
| CN | 107948658 A | 4/2018 |
| CN | 107959853 A | 4/2018 |
| CN | 108134934 A | 6/2018 |
| CN | 108200437 A | 6/2018 |
| CN | 108235009 A | 6/2018 |
| CN | 108293127 A | 7/2018 |
| CN | 108293131 A | 7/2018 |
| CN | 108353184 A | 7/2018 |
| CN | 108462873 A | 8/2018 |
| CN | 109076218 A | 12/2018 |

(56) References Cited

FOREIGN PATENT DOCUMENTS

| | | |
|---|---|---|
| CN | 109076236 A | 12/2018 |
| CN | 109089119 A | 12/2018 |
| CN | 110169073 A | 8/2019 |
| CN | 110662070 A | 1/2020 |
| CN | 113615193 | 11/2021 |
| CN | 113302937 B | 8/2024 |
| CN | 114466197 B | 10/2024 |
| CN | 113273186 B | 1/2025 |
| CN | 113330739 B | 1/2025 |
| EP | 2245857 A1 | 11/2010 |
| EP | 2532160 A1 | 12/2012 |
| EP | 2668784 A1 | 12/2013 |
| EP | 2741499 A1 | 6/2014 |
| EP | 2983365 A1 | 2/2016 |
| EP | 3343925 A1 | 7/2018 |
| EP | 3791585 A1 | 3/2021 |
| EP | 3791588 A1 | 3/2021 |
| EP | 3794825 A1 | 3/2021 |
| GB | 201111867 | 8/2011 |
| GB | 2488815 A | 9/2012 |
| GB | 2492778 A | 1/2013 |
| GB | 2588006 A | 4/2021 |
| IN | 546695 | 7/2024 |
| IN | 555523 | 11/2024 |
| IN | 556524 | 12/2024 |
| IN | 561154 | 2/2025 |
| JP | 2008048199 A | 2/2008 |
| JP | 2009205972 A | 9/2009 |
| JP | 2009211458 A | 9/2009 |
| JP | 2013110766 A | 6/2013 |
| JP | 2013537772 A | 10/2013 |
| JP | 2014501091 A | 1/2014 |
| JP | 2014509480 A | 4/2014 |
| JP | 2014197883 A | 10/2014 |
| JP | 2016059066 A | 4/2016 |
| JP | 2017028712 A | 2/2017 |
| JP | 2017123542 A | 7/2017 |
| JP | 2019515587 A | 6/2019 |
| JP | 2020523853 A | 8/2020 |
| JP | 2021052373 A | 4/2021 |
| JP | 2021510265 A | 4/2021 |
| JP | 2021513795 A | 5/2021 |
| JP | 2022504073 A | 1/2022 |
| JP | 2022507682 A | 1/2022 |
| JP | 2022507683 A | 1/2022 |
| JP | 7502380 B2 | 6/2024 |
| JP | 7534474 B2 | 8/2024 |
| JP | 7544883 B2 | 9/2024 |
| JP | 7572499 B2 | 10/2024 |
| KR | 20170058871 A | 5/2017 |
| KR | 20170115969 A | 10/2017 |
| KR | 102680903 B1 | 7/2024 |
| MX | 419284 | 11/2024 |
| MY | 205445 A | 10/2024 |
| RU | 2550554 C2 | 5/2015 |
| RU | 2571572 C2 | 12/2015 |
| RU | 2632158 C2 | 10/2017 |
| RU | 2669005 C2 | 10/2018 |
| TW | 201444349 A | 11/2014 |
| TW | 201832556 A | 9/2018 |
| TW | I863924 B | 12/2024 |
| WO | 2009040873 A1 | 4/2009 |
| WO | 2011095259 A1 | 8/2011 |
| WO | 2011095260 A1 | 8/2011 |
| WO | 2012074344 A2 | 6/2012 |
| WO | 2012095467 A1 | 7/2012 |
| WO | 2012172668 A1 | 12/2012 |
| WO | 2013081365 A1 | 6/2013 |
| WO | 2013157251 A1 | 10/2013 |
| WO | 2014007058 A1 | 1/2014 |
| WO | 2014054267 A1 | 4/2014 |
| WO | 2015006920 A1 | 1/2015 |
| WO | 2015010226 A1 | 1/2015 |
| WO | 2015042432 A1 | 3/2015 |
| WO | 2015052273 A1 | 4/2015 |
| WO | 2015080014 A1 | 6/2015 |
| WO | 2015100726 A1 | 7/2015 |
| WO | 2015180014 A1 | 12/2015 |
| WO | 2016008409 A1 | 1/2016 |
| WO | 2016054979 A1 | 4/2016 |
| WO | 2016091161 A1 | 6/2016 |
| WO | 2017043734 A1 | 3/2017 |
| WO | 2017058633 A1 | 4/2017 |
| WO | 2017076221 A1 | 5/2017 |
| WO | 2017084512 A1 | 5/2017 |
| WO | 2017147765 A1 | 9/2017 |
| WO | 2017197126 A1 | 11/2017 |
| WO | 2017222237 A1 | 12/2017 |
| WO | 2018012886 A1 | 1/2018 |
| WO | 2018026148 A1 | 2/2018 |
| WO | 2018045944 A1 | 3/2018 |
| WO | 2018048904 A1 | 3/2018 |
| WO | 2018058526 A1 | 4/2018 |
| WO | 2018061522 A1 | 4/2018 |
| WO | 2018065397 A2 | 4/2018 |
| WO | 2018070107 A1 | 4/2018 |
| WO | 2018127119 A1 | 7/2018 |
| WO | 2018205914 A1 | 11/2018 |
| WO | 2018231700 A1 | 12/2018 |
| WO | 2018237299 A1 | 12/2018 |
| WO | 2019223746 A1 | 11/2019 |
| WO | 2020003275 A1 | 1/2020 |
| WO | 2020003279 A1 | 1/2020 |
| WO | 2020003284 A1 | 1/2020 |
| WO | 2020008352 A1 | 1/2020 |
| WO | 2020113051 A2 | 6/2020 |

OTHER PUBLICATIONS

US 11,057,638 B2, 07/2021, Li (withdrawn)
US 11,070,795 B2, 07/2021, Zhang (withdrawn)
US 11,070,798 B2, 07/2021, Zhang (withdrawn)
US 11,070,835 B2, 07/2021, Zhang (withdrawn)
US 11,076,165 B2, 07/2021, Li (withdrawn)
US 11,082,689 B2, 08/2021, Li (withdrawn)
US 11,082,690 B2, 08/2021, Li (withdrawn)
US 11,082,691 B2, 08/2021, Li (withdrawn)
US 11,089,321 B2, 08/2021, Zhang (withdrawn)
Document: JVET-M0124, Zhao, J., et al., "CE4: Methods of Reducing Number of Pruning Checks of History Based Motion Vector Prediction (Test 4.1.1)," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Jie, J., et al., "A fast candidate selection method for Merge mode based on adaptive threshold," Journal of Optoelectronics—Laser, vol. 27, No. 9, DOI: 10.16136/j.joel.2016.09.0779, Sep. 2016, 7 pages.
Non-Final Office Action dated Jul. 3, 2023, 101 pages, U.S. Appl. No. 17/374,160, filed Jul. 13, 2021.
Non-Final Office Action dated Aug. 21, 2023, 126 pages, U.S. Appl. No. 17/374,208, filed Jul. 13, 2021.
Non-Final Office Action dated Aug. 7, 2023, 101 pages, U.S. Appl. No. 17/374,311, filed Jul. 13, 2021.
Non-Final Office Action from U.S. Appl. No. 17/011,058 dated Dec. 15, 2020.
Non-Final Office Action from U.S. Appl. No. 17/071,139 dated Dec. 15, 2020.
Non-Final Office Action from U.S. Appl. No. 16/993,561 dated Dec. 24, 2020.
Non-Final Office Action from U.S. Appl. No. 17/031,404 dated Dec. 24, 2020.
Notice of Allowance from U.S. Appl. No. 16/796,693 dated Feb. 10, 2021.
Notice of Allowance from U.S. Appl. No. 17/011,068 dated Mar. 1, 2021.
Notice of Allowance from U.S. Appl. No. 17/018,200 dated Mar. 1, 2021.
Final Office Action from U.S. Appl. No. 17/019,753 dated Mar. 8, 2021.

(56) References Cited

OTHER PUBLICATIONS

Final Office Action from U.S. Appl. No. 17/019,675 dated Mar. 19, 2021.
Notice of Allowance from U.S. Appl. No. 16/998,296 dated Mar. 23, 2021.
Notice of Allowance from U.S. Appl. No. 16/998,258 dated Mar. 24, 2021.
Non-Final Office Action from U.S. Appl. No. 17/011,058 dated Apr. 13, 2021.
Final Office Action from U.S. Appl. No. 17/071,139 dated Apr. 16, 2021.
International Search Report and Written Opinion from International Patent Application No. PCT/IB2019/055549 dated Aug. 20, 2019 (16 pages).
International Search Report and Written Opinion from International Patent Application No. PCT/IB2019/055575 dated Aug. 20, 2019 (12 pages).
International Search Report and Written Opinion from International Patent Application No. PCT/IB2019/055576 dated Sep. 16, 2019 (15 pages).
International Search Report and Written Opinion from International Patent Application No. PCT/IB2019/055582 dated Sep. 20, 2019 (18 pages).
International Search Report and Written Opinion from International Patent Application No. PCT/CN2020/071656 dated Apr. 3, 2020 (12 pages).
International Search Report and Written Opinion from International Patent Application No. PCT/CN2020/071332 dated Apr. 9, 2020 (9 pages).
International Search Report and Written Opinion from International Patent Application No. PCT/CN2020/072387 dated Apr. 20, 2020 (10 pages).
Non-Final Office Action from U.S. Appl. No. 17/229,019 dated Jun. 25, 2021.
Non-Final Office Action from U.S. Appl. No. 17/019,753 dated Jul. 22, 2021.
Non-Final Office Action from U.S. Appl. No. 16/796,708 dated Aug. 11, 2021.
Non-Final Office Action from U.S. Appl. No. 17/019,675 dated Nov. 18, 2021.
Yang et al. "Description of Core Experiment 4 (CE4): Inter prediction and motion vector coding" JVET-K1024 (Jul. 2018).
Non-Final Office Action from U.S. Appl. No. 17/480,184 dated Dec. 29, 2021.
Final Office Action from U.S. Appl. No. 17/480,184 dated May 2, 2022.
Non-Final Office Action from U.S. Appl. No. 17/369,132 dated Mar. 30, 2023.
Non-Final Office Action from U.S. Appl. No. 16/796,708 dated Nov. 23, 2022.
Sullivan et al., "Overview of the High Efficiency Video Coding (HEVC) Standard", IEEE Transactions on Circuits and Systems for Video Technology, vol. 22, No. 12, Dec. 2012.
Luthra et al., "Overview of the H.264/AVC video coding standard", Proceedings of SPIE vol. 5203 Applications of Digital Image Processing XXVI., 2003.
Chen et al. "Algorithm description of Joint Exploration Test Model 7 (JEM7)," JVET-G1001, (Jul. 2017).
Versatile Video Coding (WC), JVET, JEM-7.0, Available at address: https://jvet.hhi.fraunhofer.de/svn/vn_HMJEMSoftware/tags/ HM-16.6-JEM-7.0. Accessed on Feb. 11, 2020.
ITU-T H.265 "High efficiency video coding" Series H: Audiovisual and Multimedia SystemsInfrastructure of audiovisual services—Coding of movingvideo, Telecommunicationstandardization Sectorof ITU, available at address: https://www.itu.int/rec/T-REC-H.265 (Nov. 2019).
Li et al. JVET-D0117r1 "Multi-Type-Tree" Joint Video Exploration Team (JVET)of ITU-T Sg 16 WP 3 and ISO/IEC JTC 1/SC 29/WG 11, 4th Meeting: Chengdu, CN, 15-21 (Oct. 2016).

Patent for binary tree:https://patentscope.wipo.int/search/en/detail.jsf;sessionid=B6F96E719C3DECA6BB5B0830F82F2478.wapp1nC?docId=WO2016091161&recNum=1&maxRec=&office=&prevFilter=&sortOption=&queryString=&tab=FullText#fig0004, Jun. 16, 2016.
Chen et al. "Description of SDR, HDR and 360° video coding technology proposal by Qualcomm and Technicolor—Low and high complexity versions", Joint Video Exploration Team (JVET) of ITU-T SG 16 WP 3 and ISO/IEC JTC 1/SC 29/WG 1110th Meeting: San Diego, US, JVET-J0021 (Apr. 2018).
Chen et al. "CE4.3.1: Shared merging candidate list", JVET 13th Meeting, JVET-M0170-v1 (Jan. 2019).
Wang et al. "Spec text for the agreed starting point on slicing and tiling", JVET 12th Meeting, JVET-L0686-v2 Oct. 2018).
Zhang et al. "CE4-related: History-based Motion Vector Prediction", Joint Video Experts Team (JVET) of ITU-T SG 16 WP 3 and ISO/IEC JTC 1/SC 29/WG 11, Document JVET-K0104-v5, Meeting Report of the 11th meeting of the Joint Video Experts Team (JVET), Ljubljana, SI, 10-18 (Jul. 2018).
Zhang et al., "History-Based Motion Vector Prediction in Versatile Video Coding", 2019 Data Compression Conference (DCC), IEEE, pp. 43-52, XP033548557 (Mar. 2019).
Chen et al. "Internet Video Coding Test Model" (ITM) v 2.0" "Information Technology—Coding of audio-visual t>bjects—Internet Video Coding", Geneva; XP030019221 (May 2012).
Han et al. "A dynamic motion vector referencing scheme for video coding" IEEE International Conference on Image Processing (ICIP), (Sep. 2016).
Sjoberg et al. "Description of SOR and HDR video coding technology proposal by Ericsson and Nokia" JVET Meeting, JVET-J0012-v1 (Apr. 2018).
Robert et al. "High precision FRUC with additional candidates" JVET Meeting JVET-D0046 (Oct. 2016).
Xu et al. "Intra block copy improvement on top of Tencent's CfP response" JVET Meeting, JVET-J0050-r2 (Apr. 2018).
Rapaka et al. "On intra block copy merge vector handling" JCT-VG Meeting, JCTVC-V0049 (Oct. 2015).
Lin et al. "CE3: Summary report on motion prediction for texture coding" JCT-3V Meeting, JCT3V-G0023 (Jan. 2014).
Chen et al. "Symmetrical mode for bi-prediction" JVET Meeting,JVET-J0063 (Apr. 2018).
Esenlik et al. "Description of Core Experiment 9 (CE9): Decoder Side Motion Vector Derivation" JVET-J1029-r4, Apr. 2018).
Zhang et al. "CE4-related: Restrictions on History-based Motion Vector Prediction", JVET-M0272 (Jan. 2019).
Zhang et al. "CE2-related: Early awareness of accessing temporal blocks in sub-block merge list construction", \Vet-M0273 (Jan. 2019).
Chien et al. "Enhanced AMVP Mechanism Based Adaptive Motion Search Range Decision Algorithm for Fast HEVC Coding," IEEE, Institute of Computer and Communication Engineering, 2014, pp. 3696-3699.
Kudo et al. "Motion Vector Prediction Methods Considering Prediction Continuity in HEVC," Picture Coding Symposium (PCS), 2016.
Park et al. "Hardware-friendly Advanced Motion Vector Predictor Generation for an HEVC Encoder," Journal of Semiconductor Technology and Science, Dec. 2018, 18(6):737-747.
Yu et al. "Parallel AMVP Candidate List Construction for HEVC," Conference: Visual Communications and Image Processing (VCIP), Nov. 2012, IEEE, retrieved May 12, 2016.
Document: JVET-J1029_r4, Esenlik, S., "Description of Core Experiment 9 (CE9) : Decoder Site Motion Vector Derivation," Joint Video Exploration Team (JVET) of ITU-T SG 16 WP 3 and ISO/IEC JTC 1/SC 29/WG 11 10th Meeting: San Diego, US, Apr. 10-20, 2018, 34 pages.
Zhang et al. "CE4: History-based Motion Vector Prediction(Test 4.4.7)", Joint Video Experts Team (JVET) of ITU-T SG 16 WP 3 and ISO/IEC JTC 1/SC 29/WG 11, 12th meeting: Macao, CN, Oct. 3-12, 2018, Document JVET-L0266-v/1 and v2, Oct. 12, 2018.
Yang et al. Description of Core Experiment 4 (CE4); Interprediction and Motion Vector Coding, JVET Meeting, The Joint Video Explo-

(56) References Cited

OTHER PUBLICATIONS ration Team of 1SO/IEC JTC1/SC29/WG11 and ITU-TSG.16 No Meeting San Diego, Apr. 20, 2018, Document JVET-J1024, Apr. 20, 2018.

Lee et al. "Non-CE4:HMVP Unification between the Merge and MVP List," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0373, Mar. 2019.

Zhu et al. "Simplified HMVP," Joint Video Experts Team (JVET) of ITU-T SG 16 WP 3 and 1SO/IEC JTC 1/SC 29/WG 11, 13th Meeting: Marrakech, MA, Jan. 9-18, 2019, Document JVET-M0473, Jan. 2019.

Bandyopadhyay, Saurav, "Cross-Check of JVET-M0436:AHG2: Regarding HMVO Table Size," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0562, Jan. 2019.

Zhang et al. "CE4-4.4: Merge List Construction for Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0269, Mar. 2019.

Solovyev et al. "CE-4.6: Simplification for Merge List Derivation in Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, Document JVET-N0454, Mar. 2019.

Zhang et al. "CE10-related: Merge List Construction Process for Triangular Protection Mode," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0271, Jan. 2019.

Toma et al. "Description of SOR video coding technology proposal by Panasonic", Joint Video Experts Team JVET) of ITU-T SG 16 WP 3 and ISO/IEC JTC 1/SC 29/WG 1110th Meeting: San Diego, US, JVET-J0020-v1and v2 Apr. 2018).

Guionnet et al. "CE5.h: Reducing the Coding Cost of Merge Index by Dynamic Merge Index Reallocation," Joint Collaborative Team on 3D Video Coding Extension Development of ITU-T SG 16 WP 3 and ISO/IEC JTC 1/SC 29/WG 21, 2nd Meeting: Shanghai, CN, Oct. 13-19, 2012, document JCT3V-B0078, 2012.

Lee et al. "EE2.6: Modification of Merge Candidate Derivation: ATMVP Simplification and Merge Pruning," Joint Video Exploration Team (JVET) of ITU-T SG 16 WP 3 and ISO/IEC JTC 1/SC 29/WG 11, 3rd Meeting: Geneva, CH, May 26-Jun. 2016, document JVET-C0035, 2016.

Information Technology—High efficiency coding and media delivery in heterogeneous environments—Part 2: "High Efficiency Video Coding" 1S0/IEC JTC 1/SC 29/WG 11 N 17661, ISO/IEC DIS 23008-2_201x(4th Ed.) (Apr. 2018).

Sprljan et al. "TE3 subtest 3: Local intensity compensation (LIC) for inter prediction", JCT-VG of ITU-T SG16 WP3 and ISO/IEC JTC1/SC29/WG11, 3rd Meeting: Guangzhou, CN, JCTVC-C233 (Oct. 2010).

Bordes et al. "Description of SDR, HDR and 360° video coding technology proposal by Qualcomm and Technicolor medium complexity version", JVET Meeting, JVET-J0022 (Apr. 2018).

Ma et al. "Eleventh Five-Year Plan" teaching materials for ordinary colleges and universities, Principle and Application of S7-200 PLC and Digital Speed Control Systems, Jul. 31, 2009.

Rosewarne et al. "High Efficiency Video Coding {HEVC) Test Model 16 {HM 16) Improved Encoder Description Update 9," Joint Collaborative Team on Video Coding (JCT-VG) of ITU SG 16 WP3 and 1S0/IEC JTC1/SC 29/WG 11 28th Meeting, Torino, IT, Jul. 15-21, 2017, document JCTVC-AB1002, 2017.

Chen et al. "Algorithm Description for Versatile Video Coding and Terst Model 3 (VTM 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1002, 2018.

Library USPTO Search Query, 2022.

Xin, Yakun, "Exploration and Optimization of Merge Mode Candidate Decision in HEVC," 2016 Microcomputers and Applications No. 15 Xin Yakun (School of Information Engineering, Shanghai Maritime University, Shanghai 201306) Sep. 1, 2016.

Chien et al. "CE4-Related: Modification on History-Based Mode Vector Prediction," Joint Video Exploration Team JVET) of ITU-T SG 16 WP 3 and ISO/IEC JTC 1/SC 29/WG 11, 12th Meeting, Macao, CN, Oct. 3-12, 2018, document JVET-L0401, 2018.

Sullivan et al. "Meeting Report of the 11th Meeting of the Joint Video Experts Team (JVET), Ljubljana, SI, Jul. 10-18, 2018," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K1000, 2018.

"VVC and Inter" Library USPTO Search Query, Mar. 7, 2022.

Akula et al. "Description of SDR, HDR and 360° video coding technology proposal considering mobile application scenario by Samsung, Huawei, GoPro, and Hisilicon" Joint Video Experts Team (JVET) of ITU-T SG 16 WP 3 and ISO/IEC JTC 1/SC 29/WG 11 10th Meeting: San Diego, US, Apr. 10-20, 2018, JVET-J0024-v5, 2018.

Bross et al. "Versatile Video Coding (Draft 2)," Joint Video Experts Team (JVET) of ITU-T SG 16 WP 3 and ISO/IEC ITC 1/SC 29/WG 11, 11th Meeting, Ljubljana, SI, Jul. 10-18, 2018, document JVET-K1001, 2018.

Non-Final Office Action from U.S. Appl. No. 17/457,868 dated Nov. 25, 2022.

Non-Final Office Action from U.S. Appl. No. 17/135,054 dated Nov. 25, 2022.

Notice of Eligibility of Grant from Singapore Patent Application No. 11202011714R dated Jul. 25, 2022 (10 pages).

Notice of Allowance from U.S. Appl. No. 17/229,019 dated Oct. 12, 2022.

Examination Report from Patent Application GB2020091.1 mailed Mar. 21, 2022.

Examination Report from Patent Application GB2018263.0 mailed Mar. 30, 2022.

Examination Report from Patent Application GB2019557.4 mailed Apr. 1, 2022.

Notice of Allowance from U.S. Appl. No. 17/019,675 dated Jun. 16, 2022.

Extended European Search Report European Patent Application No. 20737921.5 dated Feb. 22, 2022 (9 pages).

Notice of Allowance from U.S. Appl. No. 17/019,675 dated Mar. 11, 2022.

Notice of Allowance from U.S. Appl. No. 17/019,753 dated Dec. 1, 2021.

International Search Report and Written Opinion from International Patent Application No. PCT/CN2020/072391 dated Mar. 6, 2020 (11 pages).

International Search Report and Written Opinion from International Patent Application No. PCT/IB2019/055554 dated Aug. 20, 2019 (16 pages).

International Search Report and Written Opinion from International Patent Application No. PCT/IB2019/055556 dated Aug. 29, 2019 (15 pages).

International Search Report and Written Opinion from International Patent Application No. PCT/IB2019/055581 dated Aug. 29, 2019 (25 pages).

International Search Report and Written Opinion from International Patent Application No. PCT/IB2019/055586 dated Sep. 16, 2019 (16 pages).

International Search Report and Written Opinion from International Patent Application No. PCT/IB2019/055587 dated Sep. 16, 2019 (23 pages).

International Search Report and Written Opinion from International Patent Application No. PCT/IB2019/055588 dated Sep. 16, 2019 (21 pages).

International Search Report and Written Opinion from International Patent Application No. PCT/IB2019/055591 dated Jan. 10, 2019 (16 pages).

International Search Report and Written Opinion from International Patent Application No. PCT/IB2019/055593 dated Sep. 16, 2019 (23 pages).

(56) References Cited

OTHER PUBLICATIONS

International Search Report and Written Opinion from International Patent Application No. PCT/IB2019/055595 dated Sep. 16, 2019 (25 pages).
International Search Report and Written Opinion from International Patent Application No. PCT/IB2019/055619 dated Sep. 16, 2019 (26 pages).
International Search Report and Written Opinion from International Patent Application No. PCT/IB2019/055620 dated Sep. 25, 2019 (18 pages).
International Search Report and Written Opinion from International Patent Application No. PCT/IB2019/055621 dated Sep. 30, 2019 (18 pages).
International Search Report and Written Opinion from International Patent Application No. PCT/IB2019/055622 dated Sep. 16, 2019 (13 pages).
International Search Report and Written Opinion from International Patent Application No. PCT/IB2019/055623 dated Sep. 26, 2019 (17 pages).
International Search Report and Written Opinion from International Patent Application No. PCT/IB2019/055624 dated Sep. 26, 2019 (17 pages).
International Search Report and Written Opinion from International Patent Application No. PCT/IB2019/055625 dated Sep. 26, 2019 (19 pages).
International Search Report and Written Opinion from International Patent Application No. PCT/IB2019/055626 dated Sep. 16, 2019 (17 pages).
International Search Report and Written Opinion from International Patent Application No. PCT/IB2019/057690 dated Dec. 16, 2019 (17 pages).
International Search Report and Written Opinion from International Patent Application No. PCT/IB2019/057692 dated Jan. 7, 2020 (16 pages).
International Search Report and Written Opinion from International Patent Application No. PCT/IB2019/055571 dated Sep. 16, 2019 (20 pages).
International Search Report and Written Opinion from International Patent Application No. PCT/CN2020/080597 dated Jun. 30, 2020 (11 pages).
Non-Final Office Action from U.S. Appl. No. 16/803,706 dated Apr. 17, 2020.
Non-Final Office Action from U.S. Appl. No. 16/796,693 dated Apr. 28, 2020.
Non-Final Office Action from U.S. Appl. No. 16/796,708 dated May 29, 2020.
Non-Final Office Action from U.S. Appl. No. 16/993,598 dated Oct. 14, 2020.
Final Office Action from U.S. Appl. No. 16/796,693 dated Oct. 27, 2020.
Non-Final Office Action from U.S. Appl. No. 17/019,675 dated Nov. 10, 2020.
Non-Final Office Action from U.S. Appl. No. 17/005,634 dated Nov. 13, 2020.
Non-Final Office Action from U.S. Appl. No. 17/019,753 dated Nov. 17, 2020.
Non-Final Office Action from U.S. Appl. No. 17/031,322 dated Nov. 17, 2020.
Non-Final Office Action from U.S. Appl. No. 17/011,068 dated Nov. 19, 2020.
Non-Final Office Action from U.S. Appl. No. 17/018,200 dated Nov. 20, 2020.
Non-Final Office Action from U.S. Appl. No. 16/998,296 dated Nov. 24, 2020.
Non-Final Office Action from U.S. Appl. No. 16/998,258 dated Nov. 25, 2020.
Non-Final Office Action from U.S. Appl. No. 17/005,702 dated Nov. 27, 2020.
Non-Final Office Action from U.S. Appl. No. 17/005,574 dated Dec. 1, 2020.

Document: JVET-J0024-v2, Akula, S., et al., "Description of SDR, HDR and 360° video coding technology proposal considering mobile application scenario by Samsung, Huawei, GoPro, and HiSilicon," Joint Video Exploration Team (JVET) of ITU-T SG 16 WP 3 and ISO/IEC JTC 1/SC 29/WG 11, JVET-J0024-v2, 10th Meeting: San Diego, Apr. 10-20, 2018, 139 pages.
Document: JCTVC-S1014, Joshi, R., et al., "Screen content coding test model 3 (SCM 3)," Joint Collaborative Team on Video Coding (JCT-VC) of ITU-T SG 16 WP 3 and ISO/IEC JTC 1/SC 29/WG 11 19th Meeting: Strasbourg, FR, Oct. 17-24, 2014, 12 pages.
Non-Final Office Action from U.S. Appl. No. 17/975,323 dated Oct. 25, 2023.
Chinese Notice of Allowance from Chinese Patent Application No. 202080009387.0 dated May 16, 2024, 6 pages.
Extended European Search Report from European Application No. 23213700.0 dated May 16, 2024, 24 pages.
Final Office Action from U.S. Appl. No. 17/388,146 dated Jun. 5, 2024, 34 pages.
Notice of Allowance from U.S. Appl. No. 18/156,666 dated Jun. 13, 2024, 22 pages.
Non-Final Office Action from U.S. Appl. No. 17/380,225 dated Jul. 10, 2024, 21 pages.
Notice of Allowance from U.S. Appl. No. 18/156,666 dated Sep. 16, 2024, 18 pages.
Chinese Notice of Allowance from Chinese Patent Application No. 202210307588.X dated Aug. 1, 2024, 6 pages.
Murakami, A., et al., "High-efficiency image symbolization technology," HEVC/H.265 and its applications, version 1, ISBN: 978-4-274-21329-8, Feb. 15, 2013, 40 pages. With English Translation.
H.265/HEVC, Oct. 21, 2013, ISBN: 978-4-8443-3468-2, 12 pages. With English Translation.
Japanese Office Action from Japanese Application No. 2023-028883 dated Feb. 27, 2024, 5 pages. With English Translation.
Notice of Allowance from U.S. Appl. No. 16/796,693 dated Mar. 20, 2024, 17 pages.
Notice of Allowance for Brazilian Application No. 112020024202, mailed Oct. 3, 2024, 10 pages.
Communication Pursuant to Article 94(3) for European Application No. 19739405.9, mailed Feb. 1, 2023, 7 Pages.
Decision of Refusal for Japanese Application No. 2022-102073, mailed Feb. 20, 2024, 4 Pages.
Document: JCTVC-G157, Hendry, "Reference List Construction for Random Access Settings," Joint Collaborative Team on Video Coding (JCT-VC) of ITU-T SG16 WP3 and ISO/IEC JTC1/SC29/WG11 7th Meeting: Geneva, CH, Nov. 21-30, 2011, 5 pages.
Examination Report for Great Britian Application No. 2019557.4, mailed Mar. 1, 2023, 2 Pages.
Extended European Search Report for European Application No. 23210728.4, mailed May 16, 2024, 22 pages.
Extended European Search Report for European Application No. 23220522.9, mailed Feb. 2, 2024, 7 Pages.
Extended European Search Report for European Application No. 23220549.2, mailed Feb. 2, 2024, 13 pages.
Extended European Search Report for European Application No. 23220550.0, mailed Feb. 2, 2024, 6 Pages.
Extended European Search Report for European Application No. 23220578.1, mailed Feb. 5, 2024, 7 Pages.
Final Office Action for U.S. Appl. No. 16/796,708, mailed Nov. 5, 2020, 11 Pages.
Final Office Action for U.S. Appl. No. 17/011,058, mailed Aug. 6, 2021, 21 Pages.
Final Office Action for U.S. Appl. No. 17/031,322, mailed Feb. 26, 2021, 21 Pages.
Japanese Notice of Allowance from Japanese Patent Application No. 2023-053264 dated Jul. 2, 2024, 4 pages.
Liao R-L., et al., "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, Document: JVET-L0124-v2, 160 Pages.
Murakami et al. "High Efficiency Video Coding," HEVC / H.265, 2013. High-efficiency image symbolization technology p. 125-136 ISBN: 978-4-274-21329-8, Feb. 25, 2013 p. 125-136.

(56) References Cited

OTHER PUBLICATIONS

Nevdyaev, "Telecommunication Technologies," English-Russian Explanatory Dictionary and Reference Book, Communications and Business, Moscow, 2002, 5 Pages.
Non-Final Office Action for U.S. Appl. No. 17/018,214, mailed Dec. 1, 2020, 7 Pages.
Non-Final Office Action for U.S. Appl. No. 17/071,084, mailed Dec. 10, 2020, 12 Pages.
Notice of Allowance for U.S. Appl. No. 17/005,574, mailed Mar. 17, 2021, 8 Pages.
Notice of Allowance for U.S. Appl. No. 17/457,868, mailed Jul. 6, 2023, 20 Pages.
Office Action for Taiwan Application No. 108133113, mailed Apr. 26, 2024, 23 pages.
Partial European Search Report for European Application No. 23213700.0, mailed Jan. 12, 2024, 23 Pages.
Partial European Search Report from European Appliciation No. 23210728.4 dated Jan. 10, 2024, 19 pages.
Sjoberg R., et al., "Description of SDR and HDR Video Coding Technology Proposal by Ericsson and Nokia," Joint Video Exploration Team(JVET) of ITU-T SG 16 WP 3 and ISO/IEC JTC 1/SC 29/WG 11, 10th Meeting: San Diego, CA, USA, Apr. 10-20, 2018, Document: JVET-J0012-v1, 32 Pages.
Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, Jul. 10-18, 2018, Document JVET-K0104, 2018.
Zhang L., et al., "CE4-Related: History-Based Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0104-v1, 5 Pages.
Zhang L., et al., "CE4-Related: History-Based Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0104-v2, 6 Pages.
Notice of Opinion on the First Review for Chinese Application No. 202210562776.7, mailed on Jan. 9, 2025, 22 pages.
Notice of Opinion on the First Review for Chinese Application No. 202210602506.4, mailed on Jan. 9, 2025, 42 pages.
Notice of Opinion on the First Review for Chinese Application No. 202210602507.9, mailed on Jan. 10, 2025, 45 pages.
Communication Pursuant to Article 94(3) EPC for European Application No. 19740068.2, mailed Dec. 5, 2024, 6 pages.
Corrected Notice of Allowability for U.S. Appl. No. 17/388,146, mailed Dec. 20, 2024, 5 pages.
Final Office Action from U.S. Appl. No. 17/380,225 dated Dec. 4, 2024, 28 pages.
Notice of Allowance for U.S. Appl. No. 17/388,146, mailed Dec. 19, 2024, 18 pages.
Registration Procedure Notice for Chinese Application No. 202080008061.6, mailed Oct. 29, 2024, 10 pages.
Notification to Grant Patent Right for Invention for Chinese Application No. 202080009388.5, mailed Oct. 31, 2024, 6 pages.
Chinese Office Action from Chinese Patent Application No. 202210543603.0 dated Jan. 7, 2025.
Request for the Submission of an Opinion for Korean Application No. 10-2020-7037975, mailed Nov. 13, 2024, 13 pages.
Technical Examination Report for Brazilian Application No. 112020024162-8, mailed Nov. 12, 2024, 4 pages.
Notice of Allowance for U.S. Appl. No. 18/156,666, mailed Nov. 29, 2024, 18 pages.

* cited by examiner

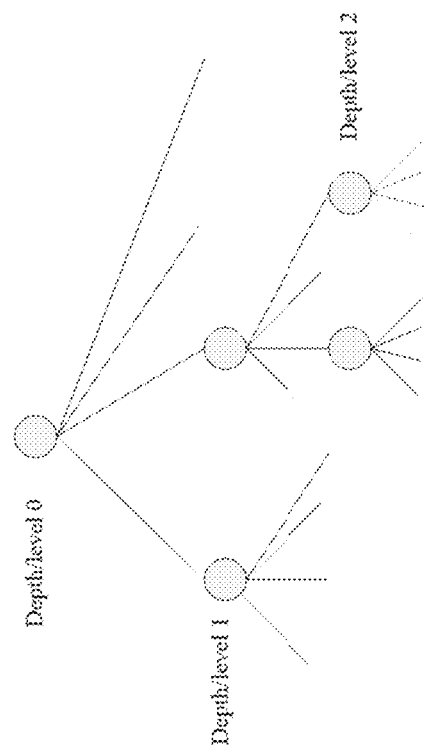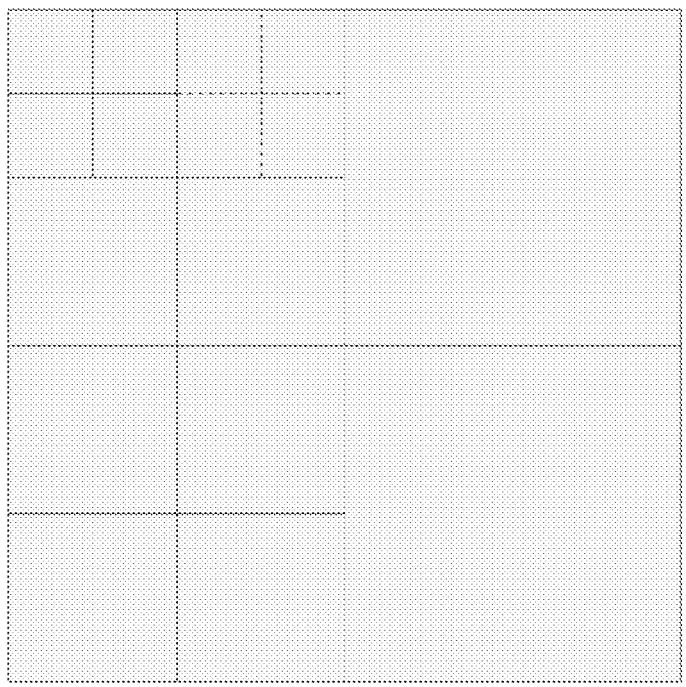
FIG. 4

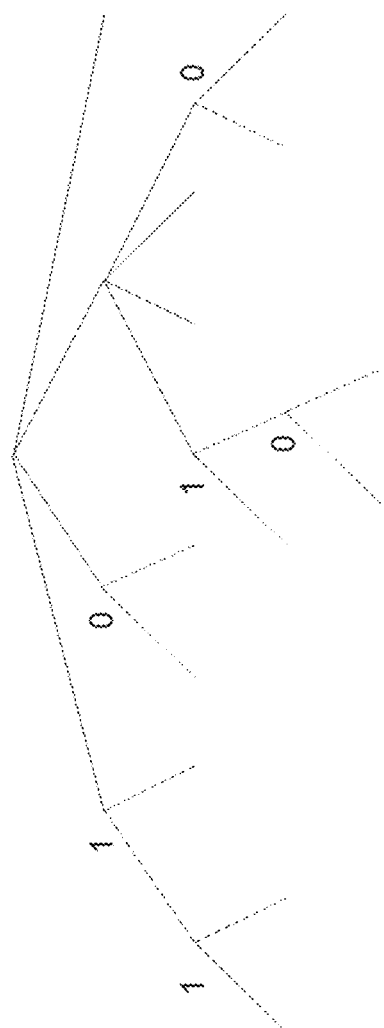
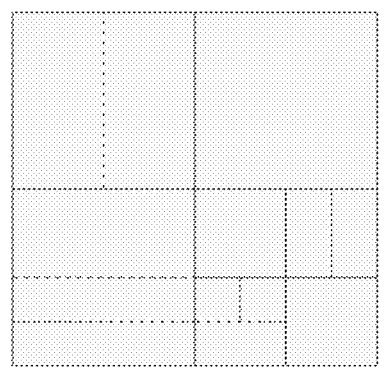
FIG. 5

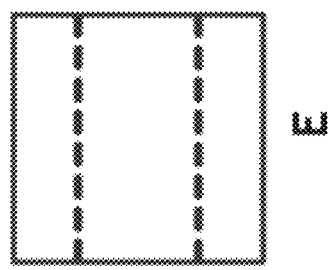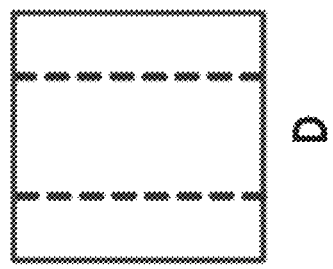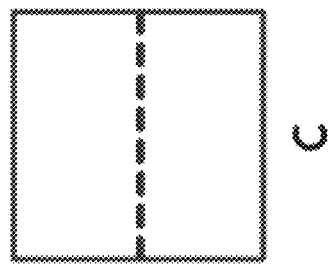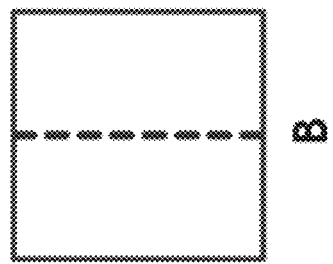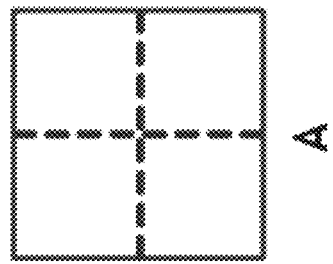
FIG. 6

INTERACTION BETWEEN MERGE LIST CONSTRUCTION AND OTHER TOOLS

CROSS-REFERENCE TO RELATED APPLICATIONS

This application is a continuation of U.S. patent application Ser. No. 17/480,184 filed on Sep. 21, 2021, which is a continuation of International Patent Application No. PCT/CN2020/080597, filed on Mar. 23, 2020, which claims the priority to and benefits of U.S. Provisional Application Number U.S. 62/822,438, filed on Mar. 22, 2019. All of the aforementioned patent applications are hereby incorporated by reference in their entireties.

TECHNICAL FIELD

The present disclosure relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This disclosure discloses methods, systems, and devices for encoding and decoding digital video based on the interaction between merge list construction and other video coding tools and methods.

In one example aspect, a method for video processing is disclosed. The method includes determining, based on a first threshold (T1), a maximum number of history-based motion vector prediction (HMVP) candidates to be checked in a table, making a decision regarding a selective checking of a number of the HMVP candidates in an order, the number of the HMVP candidates checked not exceeding the maximum number of HMVP candidates, constructing, based on the decision, a motion candidates list, and performing, based on the motion candidates list, a conversion between a current block and a bitstream representation of the current block.

In another example aspect, a method for video processing is disclosed. The method includes constructing a merge list comprising a plurality of allowed merge candidates, wherein a number of the plurality of allowed merge candidates for a current block is smaller than or equal to a maximum list size, and performing, based on the merge list, a conversion between the current block and a bitstream representation of the current block.

In yet another example aspect, a method for video processing is disclosed. The method includes constructing, based on a selective invocation of merge list construction process and a virtual candidate derivation process, a triangular merge list, and performing, based on the triangular merge list, a conversion between a current block and a bitstream representation of the current block, wherein the merge list construction process comprises constructing at least one of a spatial candidate, a temporal candidate, a history-based motion vector prediction (HMVP) candidate or a pairwise averaged candidate, and wherein the virtual candidate derivation process comprises directly copying motion information of one or more merge candidates.

In yet another example aspect, a video encoder device that implements a video encoding method described herein is disclosed.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 4 illustrates an example implementation for subdivision of a coding tree block (CTB) into CBs and transform block (TBs). Solid lines indicate CB boundaries and dotted lines indicate TB boundaries, including an example CTB with its partitioning, and a corresponding quadtree.

FIG. 5 shows an example of a Quad Tree Binary Tree (QTBT) structure for partitioning video data.

FIG. 6 shows an example of video block partitioning.

DETAILED DESCRIPTION

To improve compression ratio of video, researchers are continually looking for new techniques by which to encode video.

1. INTRODUCTION

The present disclosure is related to video coding technologies. Specifically, it is related to motion information coding (such as merge mode, advanced motion vector prediction (AMVP) mode) in video coding. It may be applied to the existing video coding standard like High Efficiency Video Coding (HEVC), or the standard Versatile Video Coding (VVC) to be finalized. It may be also applicable to future video coding standards or video codec.

Brief Discussion

Figure 1:
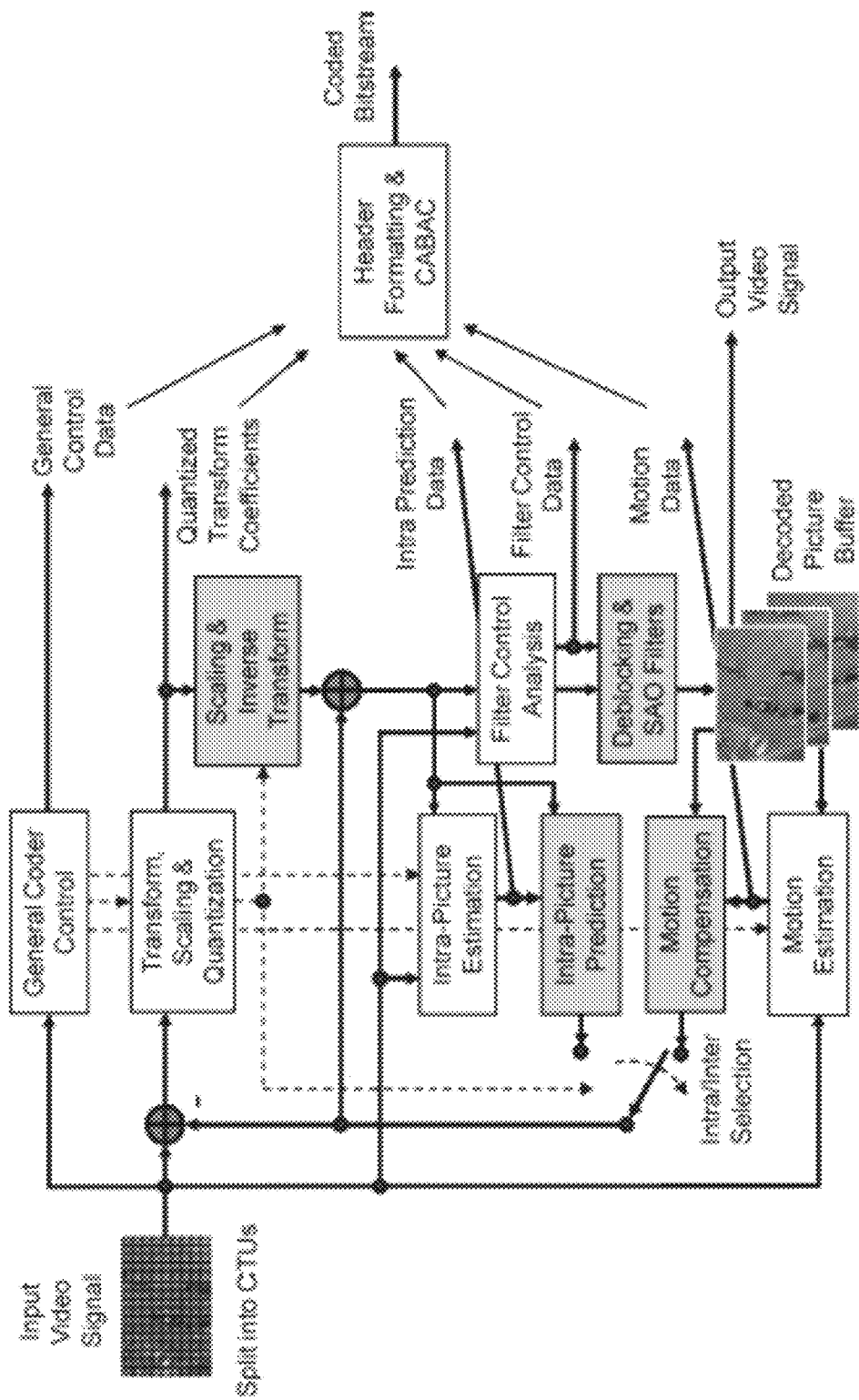
FIG. 1 is a block diagram showing an example of a video encoder implementation

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted in FIG. 1.

2.1 Partition Structure 2.1.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
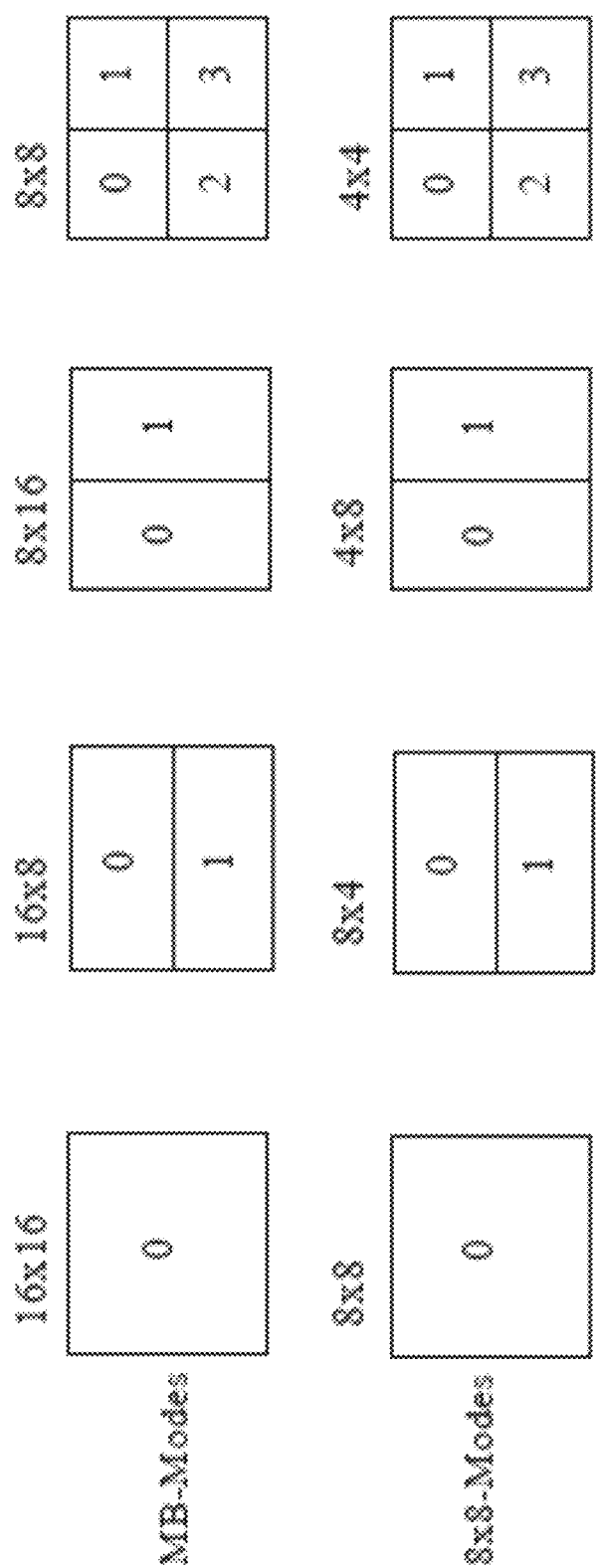
FIG. 2 illustrates macroblock partitioning in the H.264 video coding standard.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2). Only one motion vector (MV) per sub-macroblock partition is allowed.

2.1.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
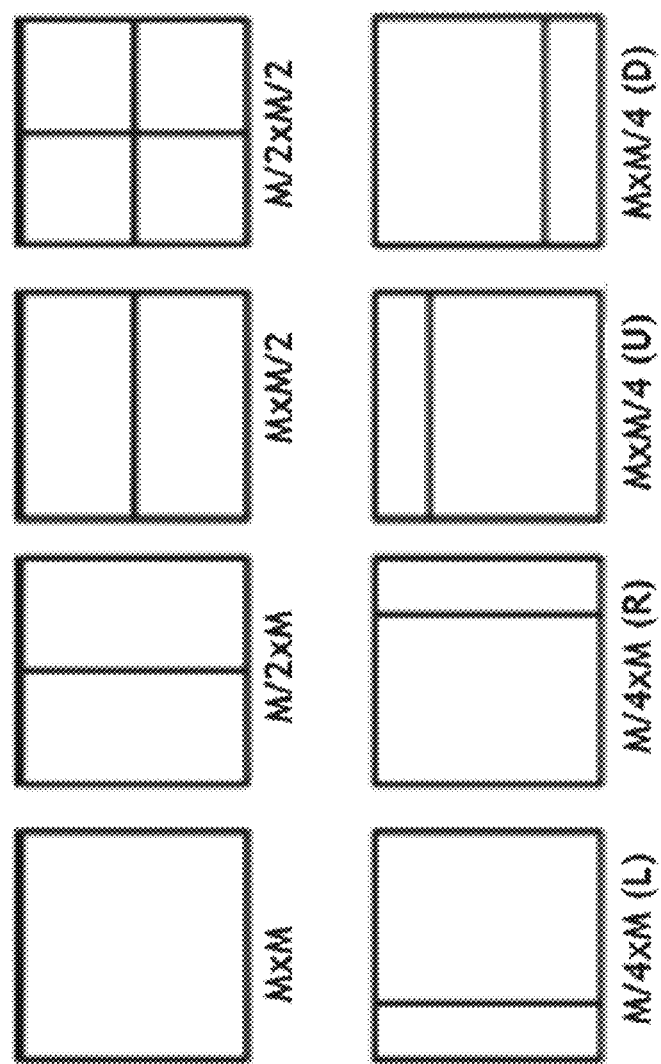
FIG. 3 illustrates an example of splitting coding blocks (CB) into prediction blocks.

3) Prediction units and prediction blocks (PB s): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for a M×M CU.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

FIG. 4 shows an example of a subdivision of a CTB into CBs (and transform block (TBs)). Solid lines indicate CB borders and dotted lines indicate TB borders. (a) CTB with its partitioning. (b) corresponding quadtree.

2.1.2.1 Tree-Structured Partitioning into Transform Blocks and Units

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the sequence parameter set (SPS), each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

2.1.2.2 Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

2.1.3 Quadtree Plus Binary Tree Block Structure with Larger CTUs in JEM

To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

2.1.3.1 QTBT Block Partitioning Structure

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g., one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
  CTU size: the root node size of a quadtree, the same concept as in HEVC
  MinQTSize: the minimally allowed quadtree leaf node size
  MaxBTSize: the maximally allowed binary tree root node size
  MaxBTDepth: the maximally allowed binary tree depth
  MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5 (left) illustrates an example of block partitioning by using QTBT, and FIG. 5 (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.1.4 Ternary-Tree for VVC

As proposed in a previous implementation, tree types other than quad-tree and binary-tree are supported. In the implementation, two more ternary tree (TT) partitions, i.e., horizontal and vertical center-side ternary-trees are introduced, as shown in FIGS. 6 (d) and (e).

FIG. 6 shows: (A) quad-tree partitioning (B) vertical binary-tree partitioning (C) horizontal binary-tree partitioning (D) vertical center-side ternary-tree partitioning (E) horizontal center-side ternary-tree partitioning.

In the previous implementation, there are two levels of trees, region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.1.5 Examples of a Partitioning Structure

The tree structure used in this response, called Multi-Tree Type (MTT), is a generalization of the QTBT. In QTBT, as shown in FIG. 5, a Coding Tree Unit (CTU) is firstly partitioned by a quad-tree structure. The quad-tree leaf nodes are further partitioned by a binary-tree structure.

The fundamental structure of MTT constitutes of two types of tree nodes: Region Tree (RT) and Prediction Tree (PT), supporting nine types of partitions, as shown in FIG. 7.

Figure 7:
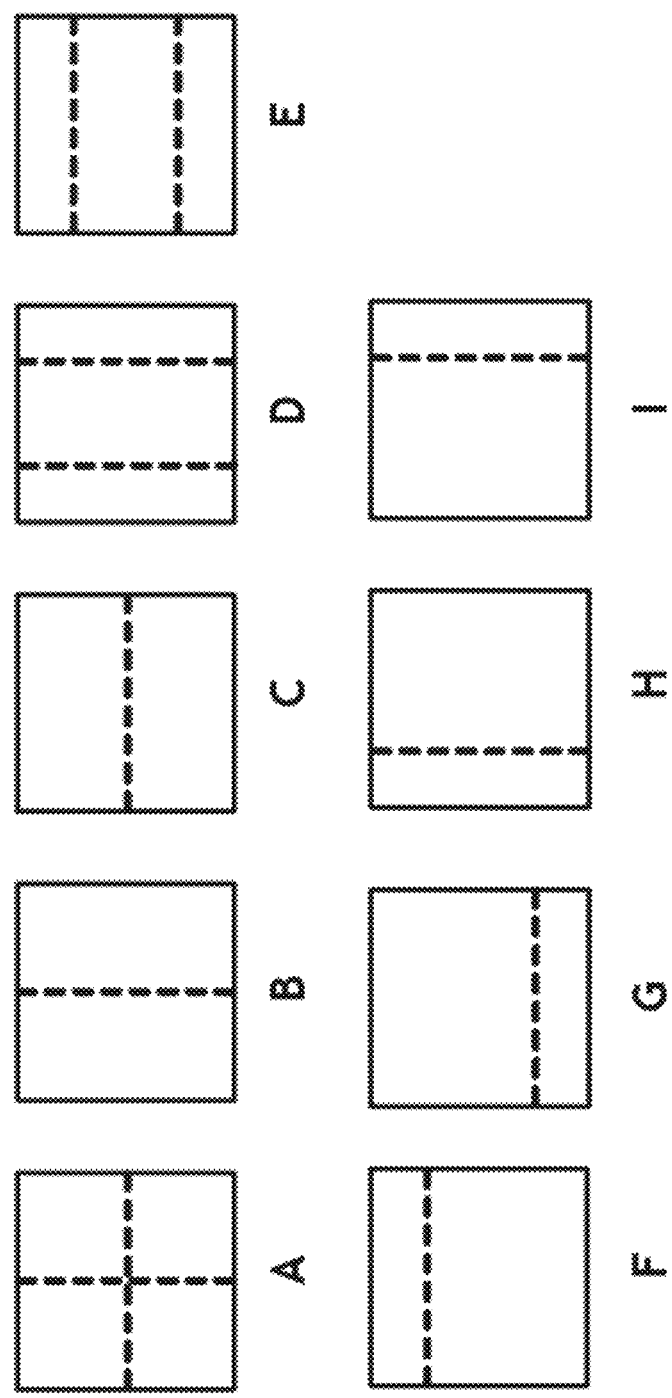
FIG. 7 shows an example of quad-tree partitioning.

FIG. 7 shows: (A) quad-tree partitioning (B) vertical binary-tree partitioning (C) horizontal binary-tree partitioning (D) vertical ternary-tree partitioning (E) horizontal ternary-tree partitioning (F) horizontal-up asymmetric binary-tree partitioning (G) horizontal-down asymmetric binary-tree partitioning (H) vertical-left asymmetric binary-tree partitioning (I) vertical-right asymmetric binary-tree partitioning.

Figure 8:
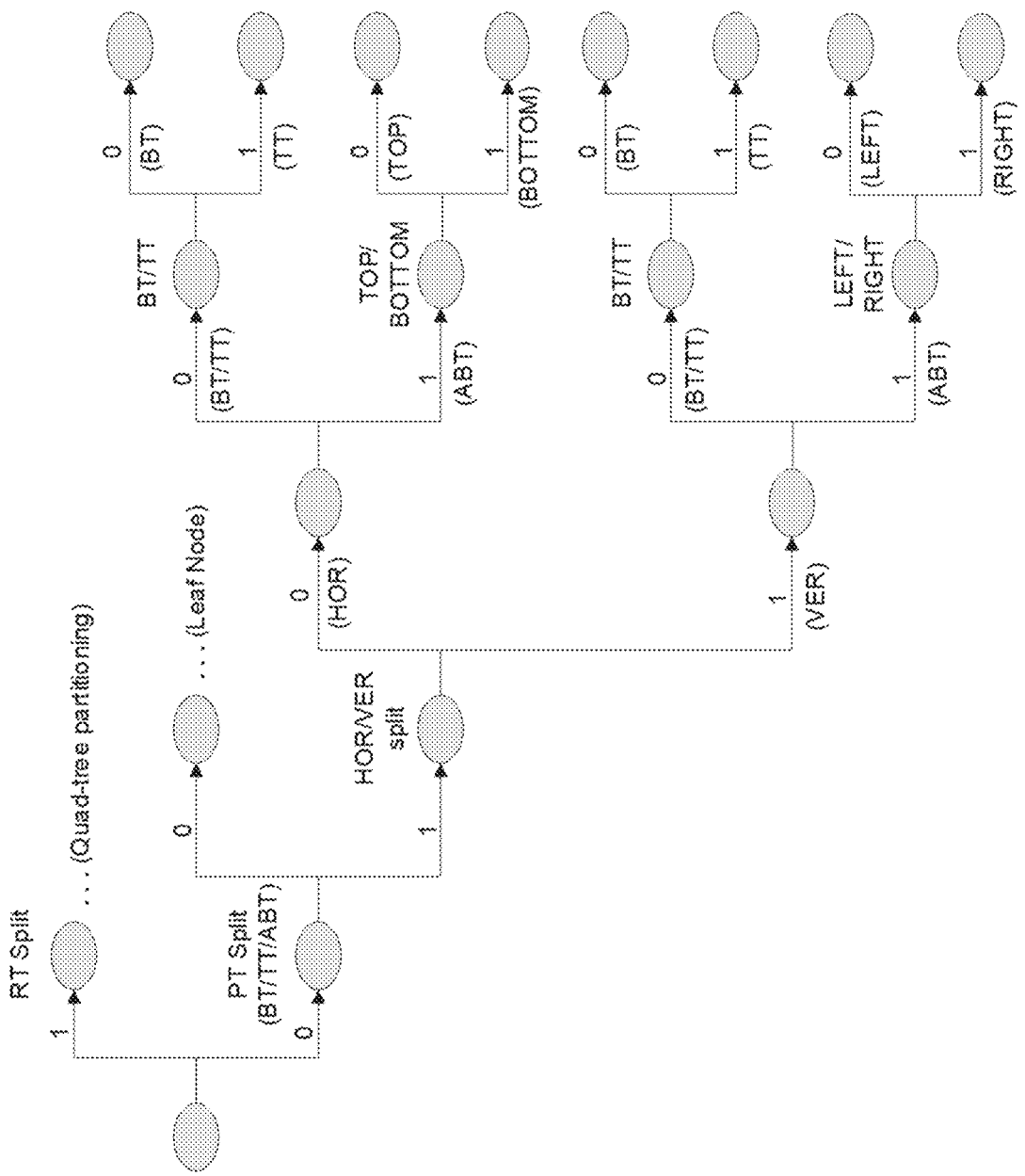
FIG. 8 shows an example of tree-type signaling.

A region tree can recursively split a CTU into square blocks down to a 4×4 size region tree leaf node. At each node in a region tree, a prediction tree can be formed from one of three tree types: Binary Tree (BT), Ternary Tree (TT), and Asymmetric Binary Tree (ABT). In a PT split, it is prohibited to have a quadtree partition in branches of the prediction tree. As in JEM, the luma tree and the chroma tree are separated in I slices. The signaling methods for RT and PT are illustrated in FIG. 8.

2.2 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors, such a coding mode is called AMVP mode.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2.1 Merge Mode 2.2.1.1 Derivation of Candidates for Merge Mode

Figure 9:
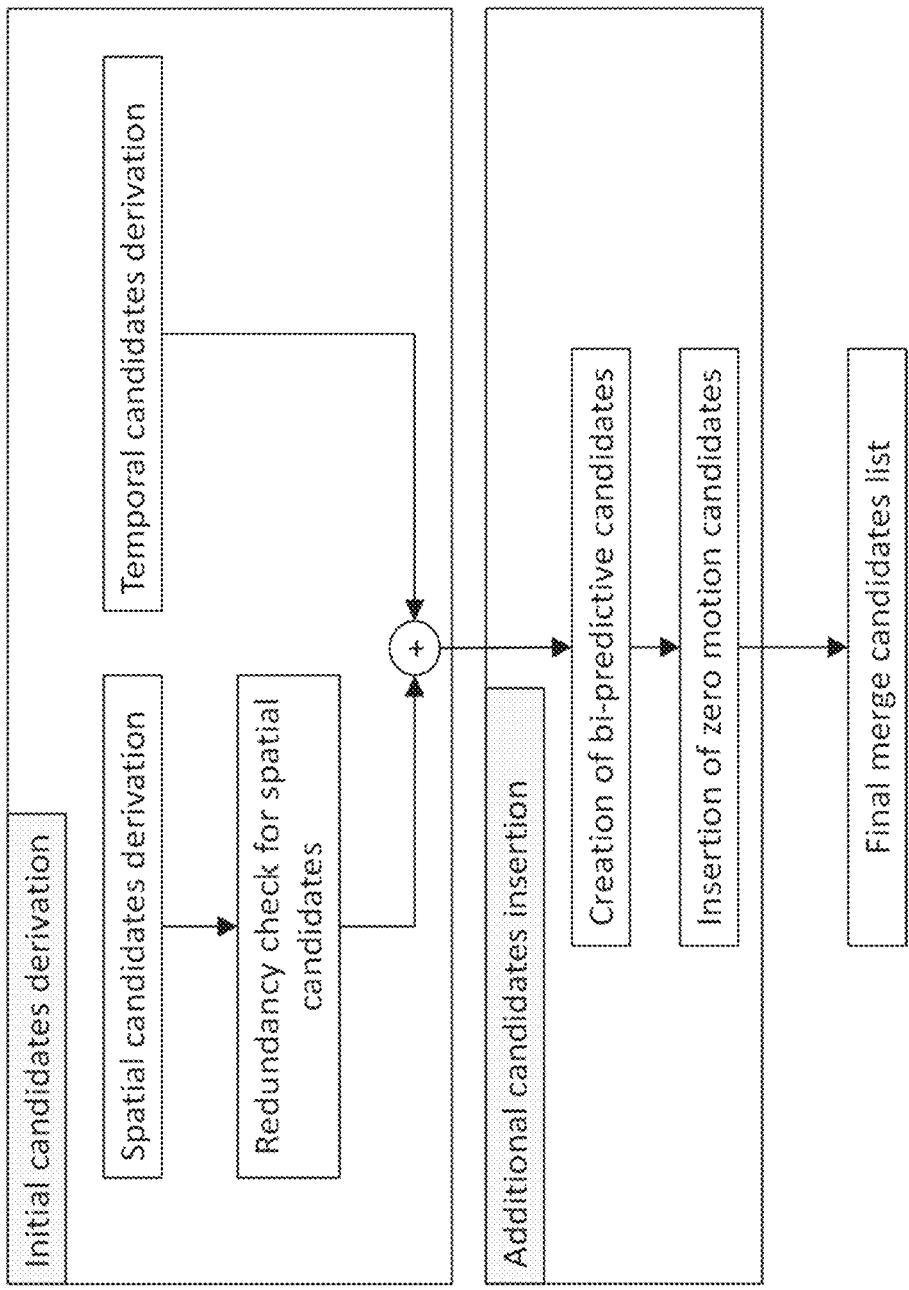
FIG. 9 shows an example of a derivation process for merge candidate list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 9. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2 Spatial Candidates Derivation

Figure 10:
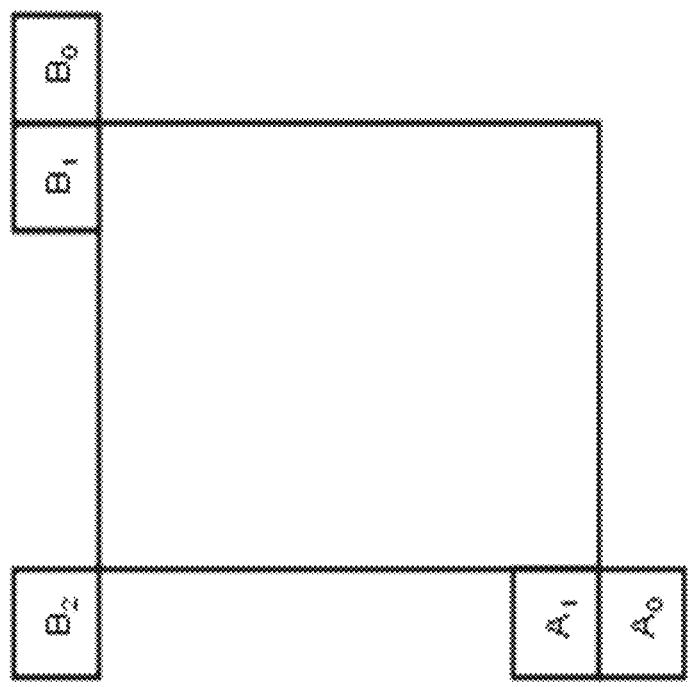
FIG. 10 shows example positions of spatial merge candidates.
Figure 11:
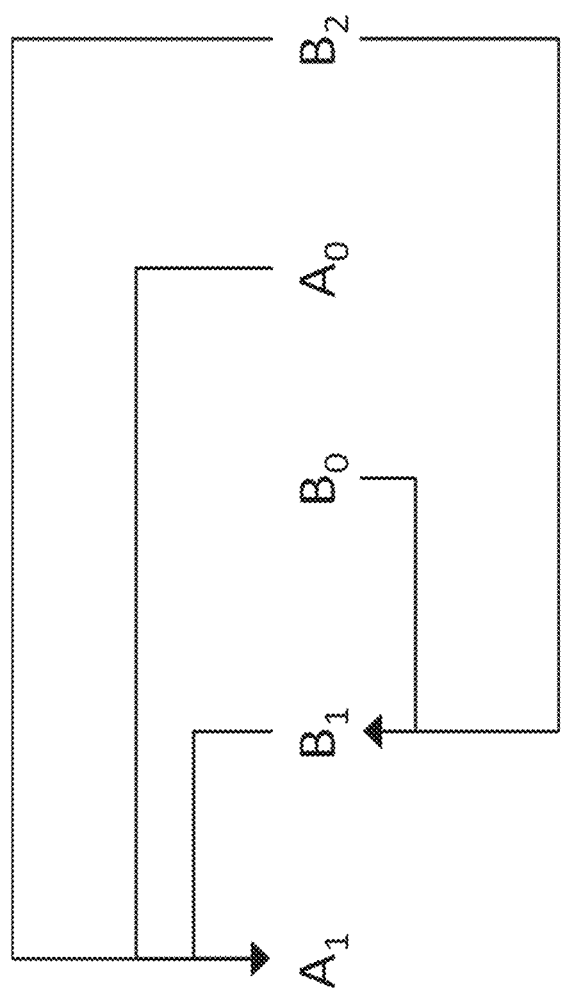
FIG. 11 shows examples of candidate pairs considered for redundancy check of spatial merge candidates.
Figure 12:
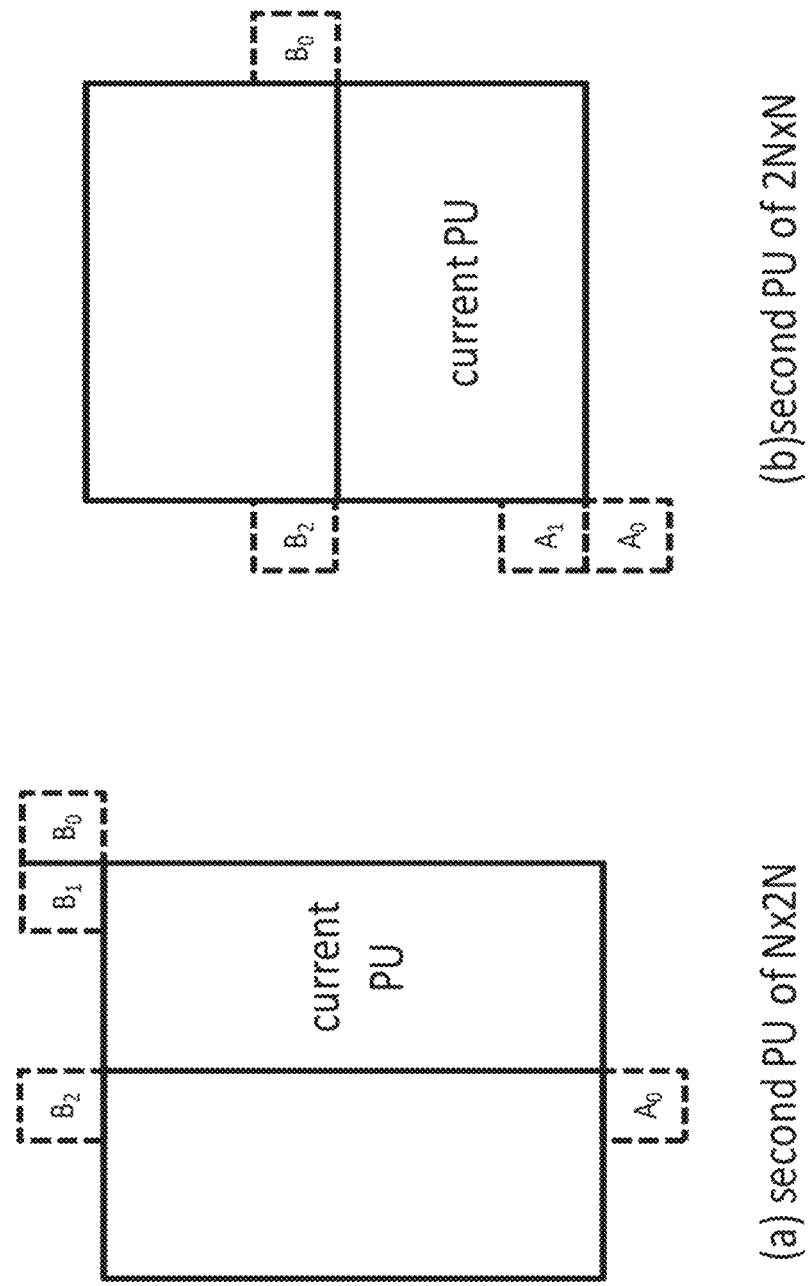
FIG. 12 shows examples of positions for the second prediction unit (PU) of N×2N and 2N×N partitions.

In the derivation of spatial merge candidates, a maximum of four merge candidates are selected among candidates located in the positions depicted in FIG. 10. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As an example, FIG. 12 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3 Temporal Candidate Derivation

Figure 13:
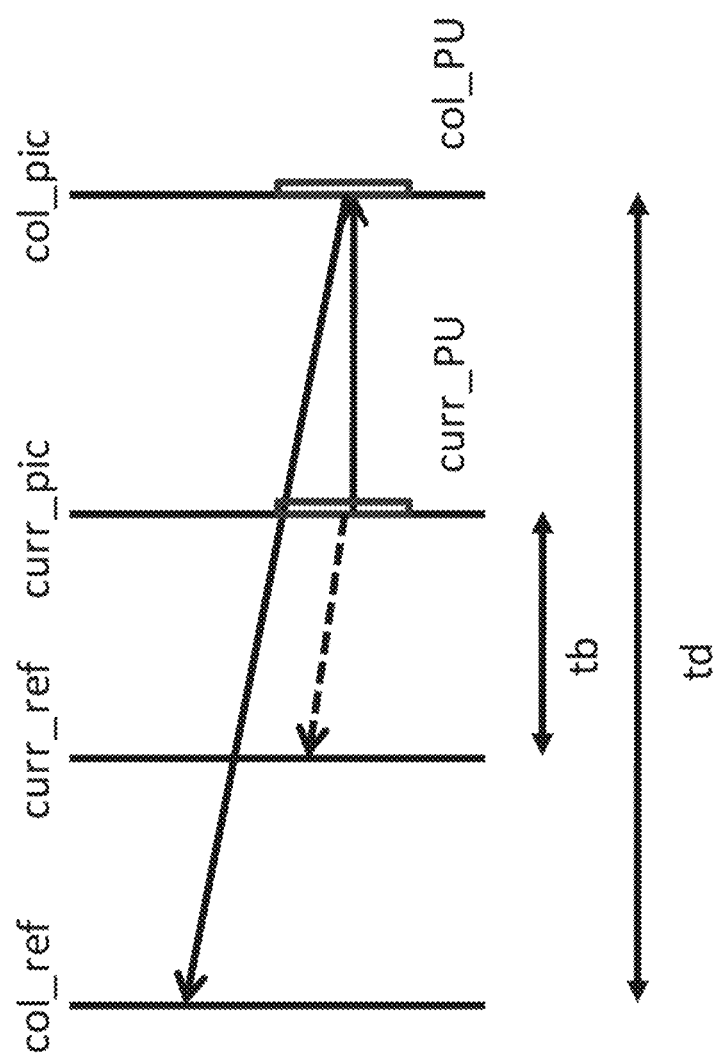
FIG. 13 illustrates motion vector scaling for temporal merge candidates.

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signaled in the slice header. The scaled motion vector for temporal merge candidate is obtained as illustrated by the dashed line in FIG. 13, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate. Illustration of motion vector scaling for temporal merge candidate.

Figure 14:
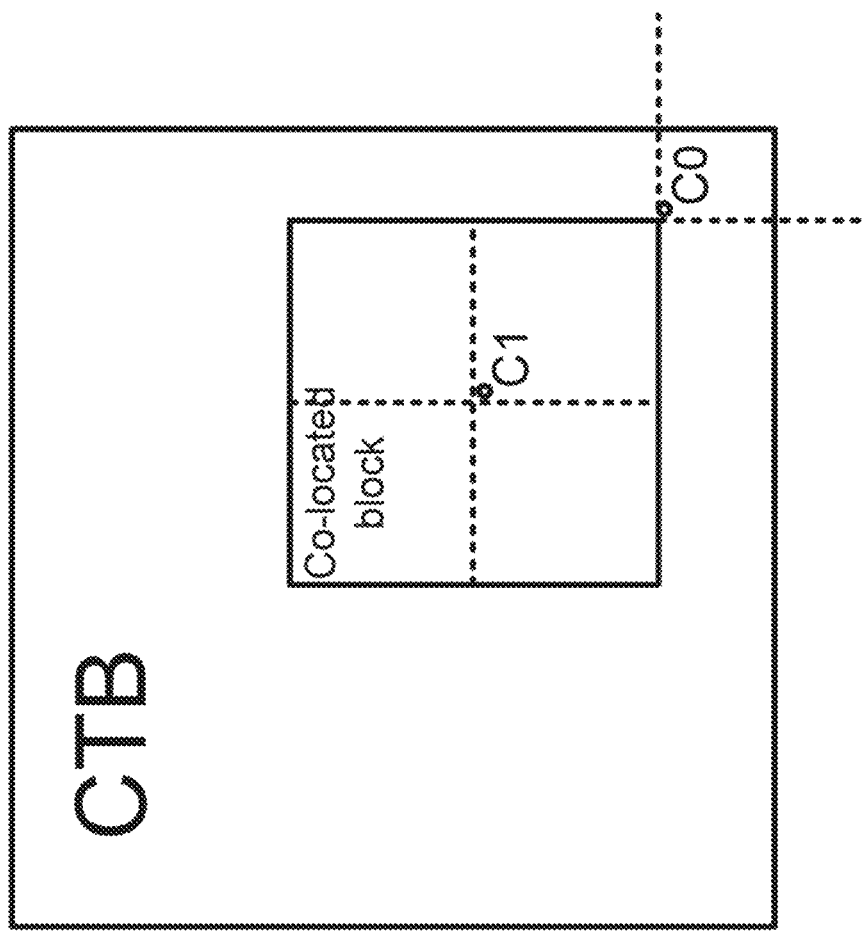
FIG. 14 shows candidate positions for temporal merge candidates, and their co-located picture.

In the co-located PU (Y) belonging to the reference frame, the position for the temporal candidate is selected between candidates $C_0$ and $C_1$, as depicted in FIG. 14. If PU at position $C_0$ is not available, is intra coded, or is outside of the current CTU, position $C_1$ is used. Otherwise, position $C_0$ is used in the derivation of the temporal merge candidate.

2.2.1.4 Additional Candidates Insertion

Figure 15:
FIG. 15 shows an example of a combined bi-predictive merge candidate.

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 15 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signaled in the picture parameter set using the "log 2_parallel_merge_level_minus2" syntax element. When a MER is defined, merge candidates falling in the same region are marked as unavailable and therefore not considered in the list construction.

7.3.2.3 Picture Parameter Set RBSP Syntax
7.3.2.3.1 General Picture Parameter Set RBSP Syntax

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| . . . | |
| pps_scaling_list_data_present_flag | u(1) |
| if( pps_scaling_list_data_present_flag ) | |
| scaling_list_data( ) | |
| lists_modification_present_flag | u(1) |
| log2_parallel_merge_level_minus2 | ue(v) |
| slice_segment_header_extension_present_flag | u(1) |
| pps_extension_present_flag | u(1) |
| . . . | |
| rbsp_trailing_bits( ) | |
| } | | log 2_parallel_merge_level_minus2 plus 2 specifies the value of the variable Log 2ParMrgLevel, which is used in the derivation process for luma motion vectors for merge mode as specified in clause 8.5.3.2.2 and the derivation process for spatial merging candidates as specified in clause 8.5.3.2.3. The value of log 2_parallel_merge_level_minus2 shall be in the range of 0 to Ctb Log 2SizeY−2, inclusive. The variable Log 2ParMrgLevel is derived as follows:

$$\text{Log 2ParMrgLevel} = \text{log 2\_parallel\_merge\_level\_minus2} + 2 \quad (7\text{-}37)$$

NOTE 3—The value of Log 2ParMrgLevel indicates the built-in capability of parallel derivation of the merging candidate lists. For example, when Log 2ParMrgLevel is equal to 6, the merging candidate lists for all the prediction units (PUs) and coding units (CUs) contained in a 64×64 block can be derived in parallel.

2.2.2 Motion Vector Prediction in AMVP Mode

Motion vector prediction exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (e.g., FIGS. 2 to 8). In the following sections, details about derivation process of motion vector prediction candidate are provided.

2.2.2.1 Derivation of Motion Vector Prediction Candidates

Figure 16:
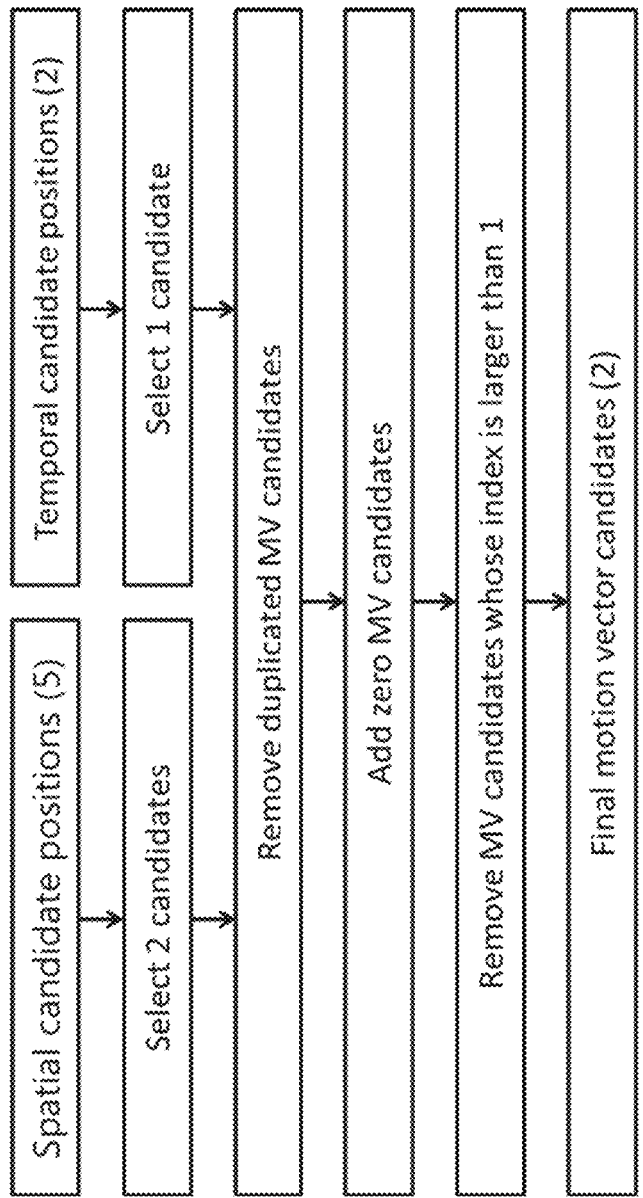
FIG. 16 shows an example of a derivation process for motion vector prediction candidates.

FIG. 16 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 11.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2 Spatial Motion Vector Candidates

In the derivation of spatial motion vector candidates, a maximum of two candidates are considered among five potential candidates, which are derived from PUs located in positions as depicted in FIG. 11, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
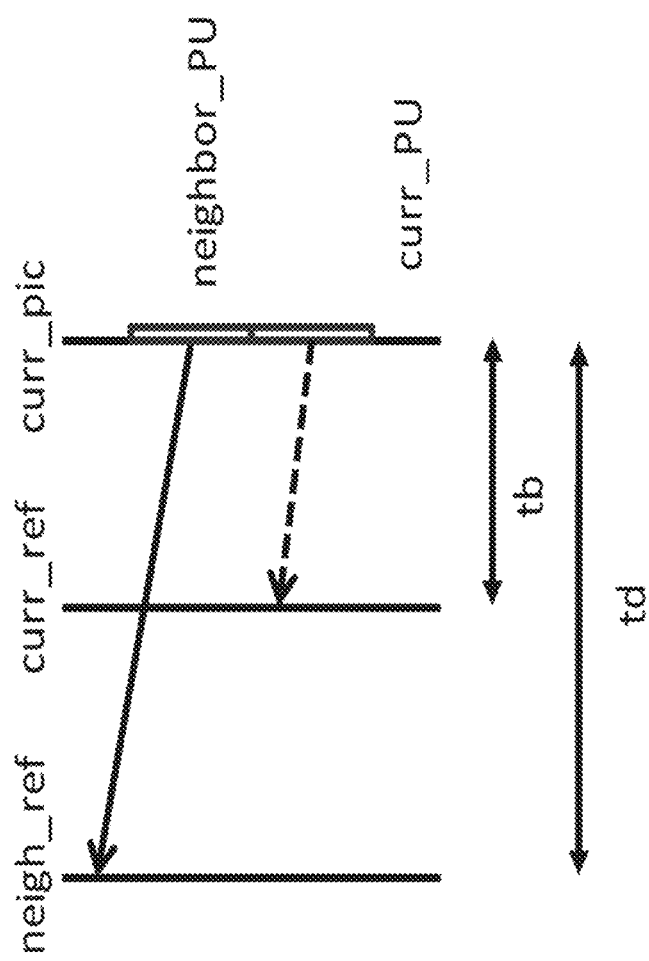
FIG. 17 shows an example of motion vector scaling for spatial motion vector candidates.

In a spatial scaling process, the motion vector of the neighboring PU is scaled in a similar manner as for temporal scaling, as depicted as FIG. 17. The main difference is that the reference picture list and index of current PU is given as input; the actual scaling process is the same as that of temporal scaling.

2.2.2.3 Temporal Motion Vector Candidates

Apart for the reference picture index derivation, all processes for the derivation of temporal merge candidates are the same as for the derivation of spatial motion vector candidates (see, e.g., FIG. 6). The reference picture index is signaled to the decoder.

2.2.2.4 Signaling of AMVP Information

For the AMVP mode, four parts may be signalled in the bitstream, i.e., prediction direction, reference index, motion vector difference (MVD) and my predictor candidate index.

Syntax tables:

| prediction_unit( x0, y0, nPbW, nPbH ) { | Descriptor |
|---|---|
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type = = B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] = = PRED_BI ) | |
| { | |
|         MvdL1[ x0 ][ y0 ][ 0 ] = 0 | |
|         MvdL1[ x0 ][ y0 ][ 1 ] = 0 | |
|       } else | |
|         mvd_coding( x0, y0, 1 ) | |
|       mvp_l1_flag[ x0 ][ y0 ] | ae(v) |
|       } | |
|     } | |
|   } | |
| } | |

7.3.8.9 Motion Vector Difference Syntax

| mvd_coding( x0, y0, refList ) { | Descriptor |
|---|---|
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

2.3 New Inter Prediction Methods in JEM (Joint Exploration Model)

2.3.1 Sub-CU Based Motion Vector Prediction

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.3.1.1 Alternative Temporal Motion Vector Prediction

Figure 18:
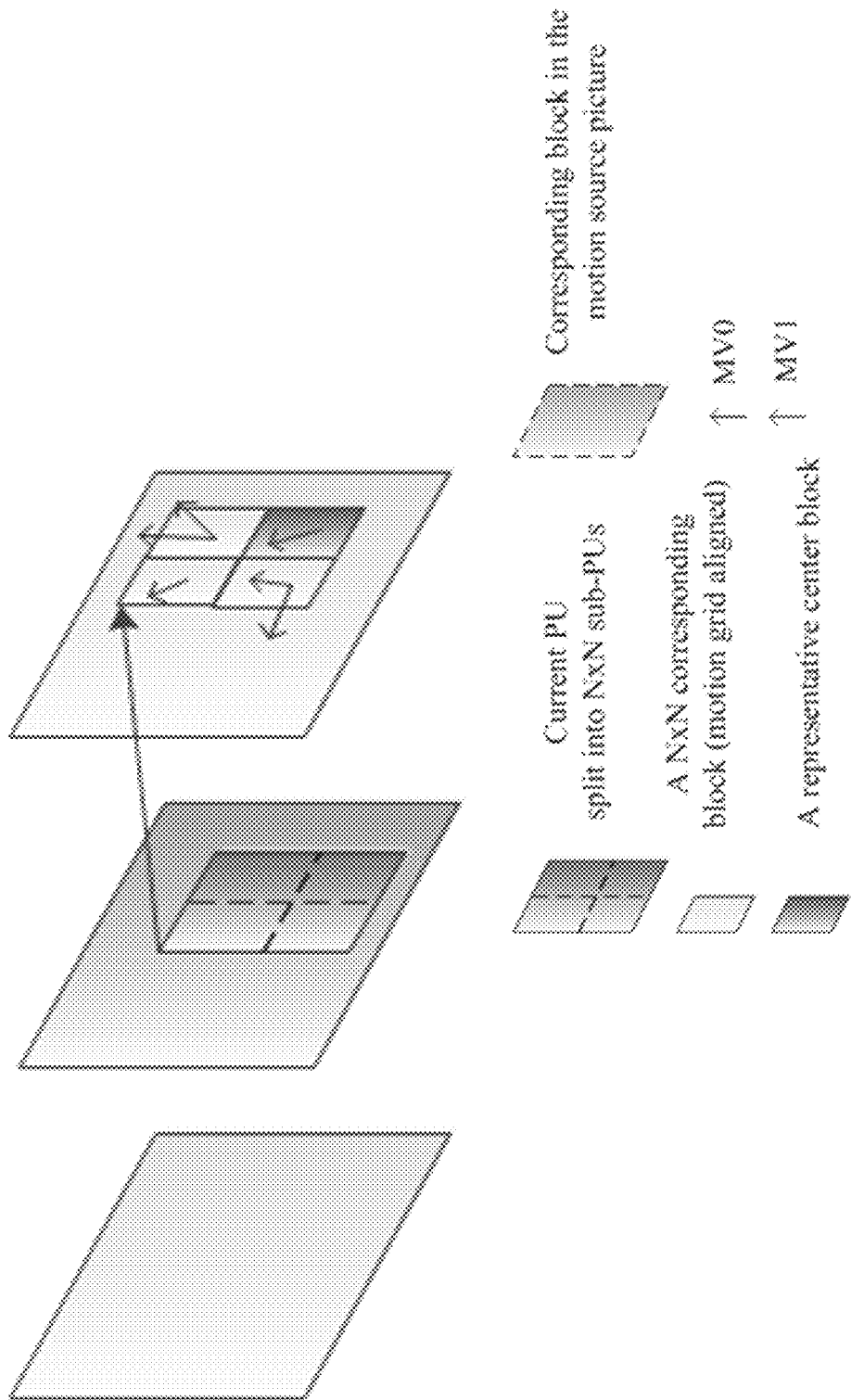
FIG. 18 shows an example Alternative Temporal Motion Vector Prediction (ATMVP) for motion prediction of a CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 18, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 18.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU. In one example, if the first merge candidate is from the left neighboring block (i.e., $A_1$ in FIG. 19), the associated MV and reference picture are utilized to identify the source block and source picture.

Figure 19:
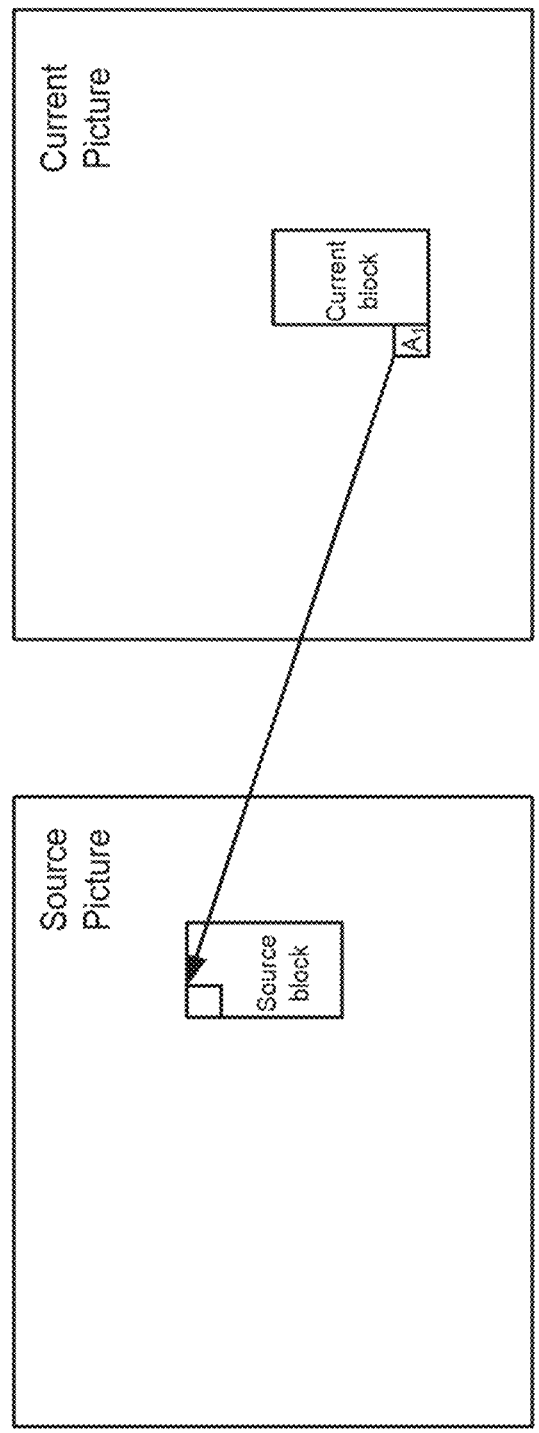
FIG. 19 pictorially depicts an example of identification of a source block and a source picture.

FIG. 19 shows an example of the identification of source block and source picture.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.3.1.2 Spatial-Temporal Motion Vector Prediction

Figure 20:
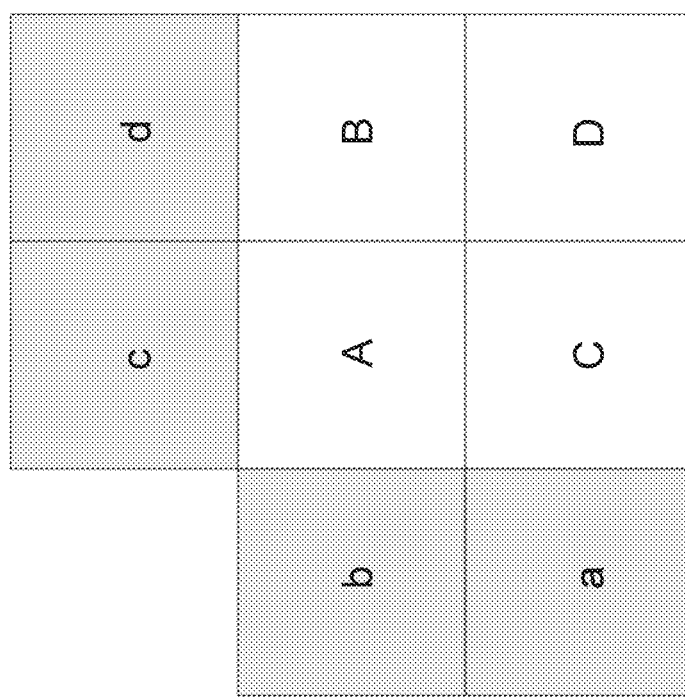
FIG. 20 shows an example of one CU with four sub-blocks and neighboring blocks.

In this method, the motion vectors of the sub-CUs are derived recursively, following raster scan order. FIG. 20 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 20 shows an example of one CU with four sub-blocks (A-D) and its neighbouring blocks (a-d).

2.3.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more rate distortion (RD) checks is needed for the two additional merge candidates.

In the JEM, all bins of merge index is context coded by CABAC. While in HEVC, only the first bin is context coded and the remaining bins are context by-pass coded.

2.3.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3.3 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad (1)$$

Figure 21:
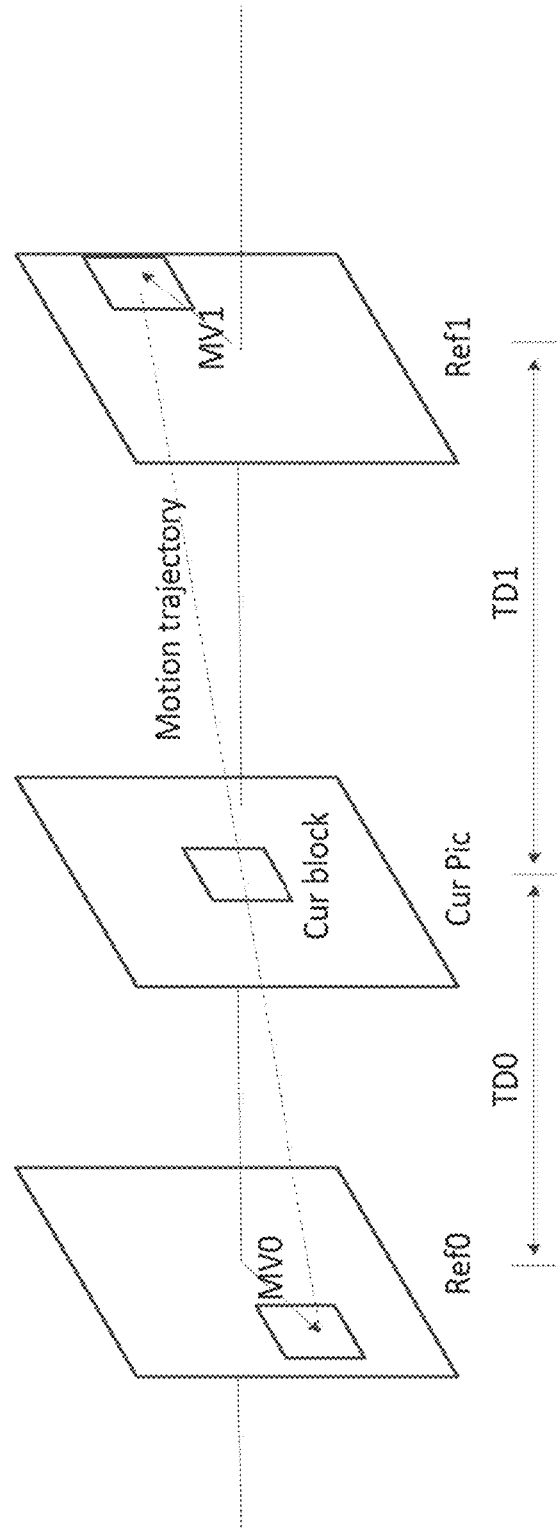
FIG. 21 illustrates an example of bilateral matching.

As shown in the FIG. 21, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 22:
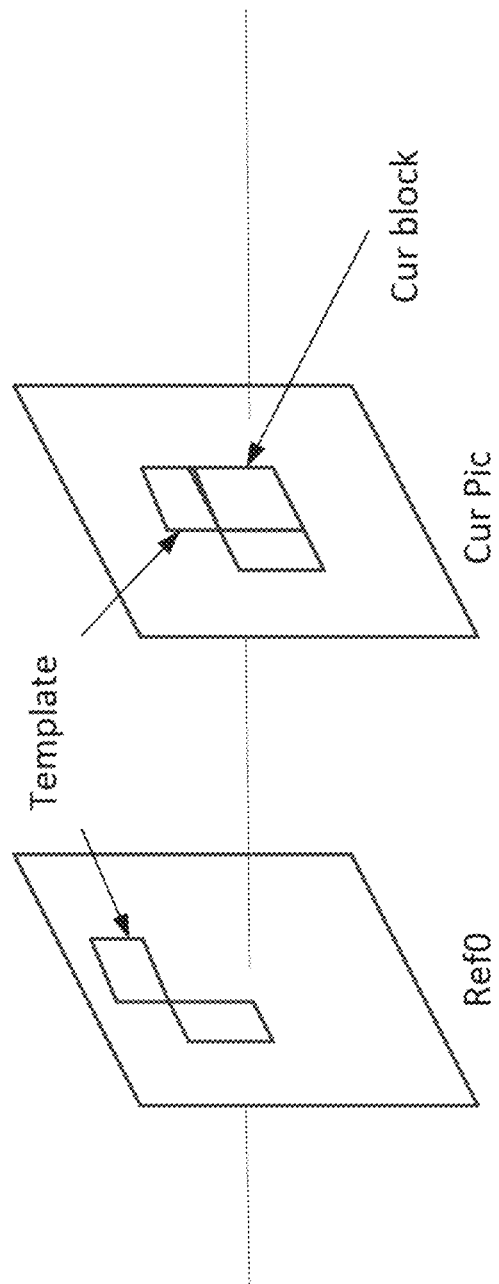
FIG. 22 illustrates an example of template matching.

As shown in FIG. 22, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.3.3.1 CU Level MV Candidate Set

The MV candidate set at CU level consists of:
(i) Original AMVP candidates if the current CU is in AMVP mode
(ii) all merge candidates,
(iii) several MVs in the interpolated MV field.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.3.3.2 Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.3.3.3 Generation of Interpolated MV Field

Before coding a frame, interpolated motion field is generated for the whole picture based on unilateral ME. Then the motion field may be used later as CU level or sub-CU level MV candidates.

Figure 23:
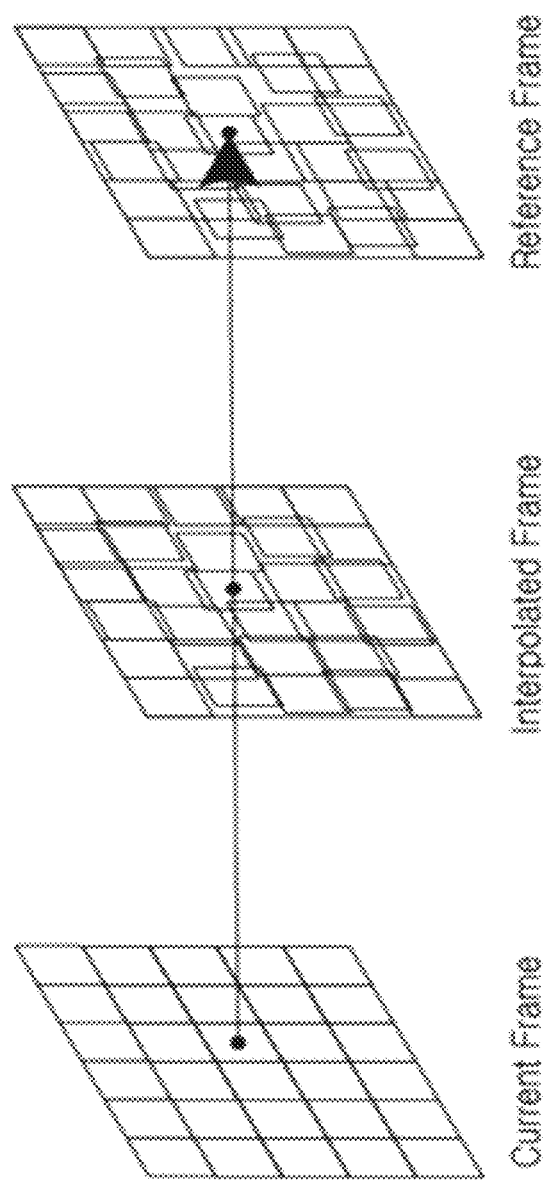
FIG. 23 depicts an example of unilateral Motion Estimation (ME) in Frame Rate Up Conversion (FRUC).

First, the motion field of each reference pictures in both reference lists is traversed at 4×4 block level. For each 4×4 block, if the motion associated to the block passing through a 4×4 block in the current picture (as shown in FIG. 23) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.3.3.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (2)$$

where w is a weighting factor which is empirically set to 4, MV and MVS indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.3.3.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.3.3.6 Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
    bi-prediction is used;
Otherwise, if cost0<=cost1
    uni-prediction from list0 is used;
Otherwise,
    uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction. The inter prediction direction selection is only applied to the CU-level template matching process.

2.3.4 Merge/Skip Mode with Bilateral Matching Refinement [8]

Figure 24:
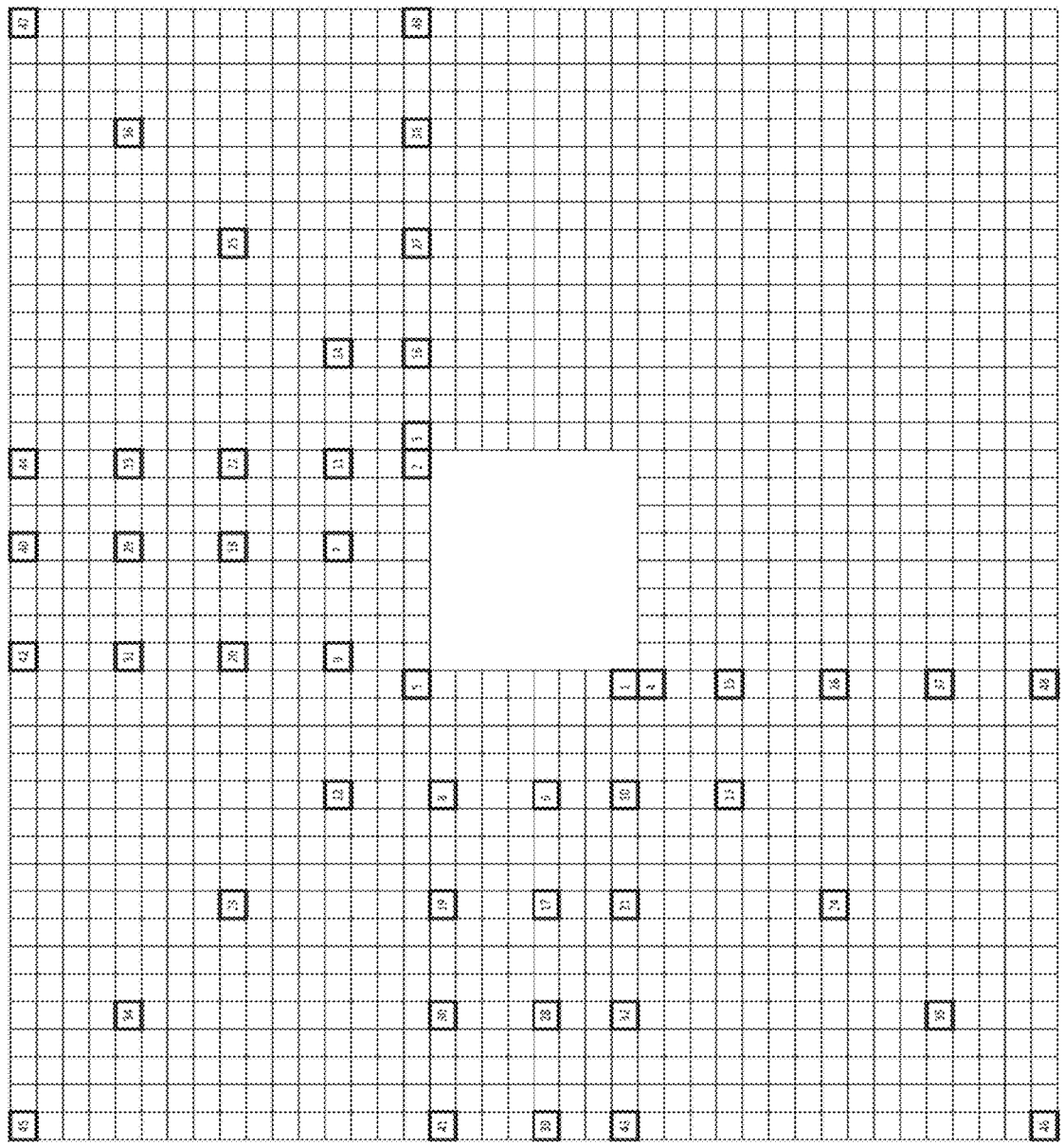
FIG. 24 shows an example of spatially neighboring blocks used to derive spatial merge candidates.

A merge candidate list is first constructed by inserting the motion vectors and reference indices of the spatial neighboring and temporal neighboring blocks into the candidate list with redundancy checking until the number of the available candidates reaches the maximum candidate size of 19. The merge candidate list for the merge/skip mode is constructed by inserting spatial candidates (FIG. 11), temporal candidates, affine candidates, advanced temporal MVP (ATMVP) candidate, spatial temporal MVP (STMVP) candidate and the additional candidates as used in HEVC (Combined candidates and Zero candidates) according to a pre-defined insertion order:

Spatial candidates for blocks 1-4.
Extrapolated affine candidates for blocks 1-4.
ATMVP.
STMVP.
Virtual affine candidate.
Spatial candidate (block 5) (used only when the number of the available candidates is smaller than 6).
Extrapolated affine candidate (block 5).
Temporal candidate (derived as in HEVC).
Non-adjacent spatial candidates followed by extrapolated affine candidate (blocks 6 to 49, as depicted in FIG. 24).
Combined candidates.
Zero candidates It is noted that illumination compensation (IC) flags are also inherited from merge candidates except for STMVP and affine. Moreover, for the first four spatial candidates, the bi-prediction ones are inserted before the ones with uni-prediction.

In [8], blocks which are not connected with the current block may be accessed. If a non-adjacent block is coded with non-intra mode, the associated motion information may be added as an additional merge candidate.

2.3.5 Shared Merge List JVET-M0170

It proposes to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

For Type-2 definition, the merge sharing node will be decided for each CU inside a CTU during parsing stage of decoding; moreover, the merge sharing node is an ancestor node of leaf CU which must satisfy the following 2 criteria:

The merge sharing node size is equal to or larger than the size threshold

In the merge sharing node, one of the child CU size is smaller than the size threshold Moreover, no samples of the merge sharing node are outside the picture boundary has to be guaranteed. During parsing stage, if an ancestor node satisfies the criteria (1) and (2) but has some samples outside the picture boundary, this ancestor node will not be the merge sharing node and it proceeds to find the merge sharing node for its child CUs.

FIG. 35 shows an example for the difference of Type-1 and Type-2 definition. In this example, the parent node is ternary-split into 3 child CUs. The size of parent node is 128. For Type-1 definition, the 3 child-CUs will be merge sharing nodes separately. But for Type-2 definition, the parent node is the merge sharing node.

The proposed shared merging candidate list algorithm supports translational merge (including merge mode and triangle merge mode, history-based candidate is also supported) and subblock-based merge mode. For all kinds of merge mode, the behavior of shared merging candidate list algorithm looks basically the same, and it just generates candidates at the merge sharing node pretending the merge sharing node is a leaf CU. It has 2 major benefits. The first benefit is to enable parallel processing for merge mode, and the second benefit is to share all computations of all leaf CUs into the merge sharing node. Therefore, it significantly reduces the hardware cost of all merge modes for hardware codec. By the proposed shared merging candidate list algorithm, the encoder and decoder can easily support parallel encoding for merge mode and it relieves the cycle budget problem of merge mode.

2.3.6 Tile Groups

JVET-L0686 was adopted in which slices are removed in favor of tile groups and the HEVC syntax element slice_address is substituted with tile_group_address in the tile_group_header (if there is more than one tile in the picture) as address of the first tile in the tile group.

3. EXAMPLES OF PROBLEMS ADDRESSED BY EMBODIMENTS DISCLOSED HEREIN

The current HEVC design could take the correlation of current block its neighbouring blocks (next to the current block) to better code the motion information. However, it is possible that that the neighbouring blocks correspond to different objects with different motion trajectories. In this case, prediction from its neighbouring blocks is not efficient.

Prediction from motion information of non-adjacent blocks could bring additional coding gain with the cost of storing all the motion information (typically on 4×4 level) into cache which significantly increase the complexity for hardware implementation.

4. SOME EXAMPLES

To overcome the drawbacks of existing implementations, lookup table (LUT)-based motion vector prediction techniques using one or more look up tables with at least one motion candidate stored to predict motion information of a block can be implemented in various embodiments to provide video coding with higher coding efficiencies. Each LUT can include one or more motion candidates, each associated with corresponding motion information. Motion information of a motion candidate can include partial or all of the prediction direction, reference indices/pictures, motion vectors, local illumination compensation (LIC) flags, affine flags, Motion Vector Derivation (MVD) precisions, and/or MVD values. Motion information may further include the block position information to indicate wherein the motion information is coming from.

The LUT-based motion vector prediction based on the disclosed technology, which may enhance both existing and future video coding standards, is elucidated in the following examples described for various implementations. Because the LUTs allow the encoding/decoding process to be performed based on historical data (e.g., the blocks that have been processed), the LUT-based motion vector prediction can also be referred to as History-based Motion Vector Prediction (HMVP) method. In the LUT-based motion vector prediction method, one or multiple tables with motion information from previously coded blocks are maintained during the encoding/decoding process. These motion candidates stored in the LUTs are named HMVP candidates. During the encoding/decoding of one block, the associated motion information in LUTs may be added to the motion candidate lists, and after encoding/decoding one block, LUTs may be updated. The updated LUTs are then used to code the subsequent blocks. The examples below should be considered as examples to explain general concepts. These examples should not be interpreted in a narrow way. Furthermore, these examples can be combined in any manner.

Some embodiments may use one or more look up tables with at least one motion candidate stored to predict motion information of a block. Embodiments may use motion candidate to indicate a set of motion information stored in a look up table. For conventional AMVP or merge modes, embodiments may use AMVP or merge candidates for storing the motion information.

The examples below explain general concepts.

Usage of Look Up Tables

1. The checking order of motion candidates in a look up table (e.g., HMVP candidates in a HMVP table) is defined as follows (suppose K>1) motion candidates are allowed to be checked):
   a. In one example, maximum number of motion candidates in a look up table (e.g., HMVP candidates in a look up table) to be checked (i.e., which may be added to the merge/AMVP candidate list) may depend on a variable.
      i. In one example, the variable is pre-defined, such as 5.
      ii. In one example, when the number of available motion candidates (such as after pruning) is smaller than the value of the variable before checking the HMVP candidates from LUTs, one or multiple motion candidates (e.g., HMVP candidates) in a look up table may be checked in order.
      iii. In one example, when the number of available motion candidates (such as after pruning) is no smaller than the value of the variable, none of the motion candidates in a look up table (e.g., HMVP candidates) may be checked in order.
   b. The checking order of different look up tables is defined in usage of look up tables in the next subsection.

c. The checking process of HMVP candidates will terminate once the merge/AMVP candidate list reaches the maximumly allowed candidate numbers of the list.
d. The checking process of HMVP candidates will terminate once the merge/AMVP candidate list reaches the maximumly allowed candidate numbers of the list minus a threshold (Th). In one example, Th may be pre-defined as a positive integer value, e.g., 1, or 2, or 3. Alternatively, Th may be adaptively changed from block to block. Alternatively, Th may be signaled in the SPS/picture parameter set (PPS)/slice header etc. Alternatively, Th may further depend on block shape/block size/coded modes etc. Alternatively, Th may depend on how many available candidates before adding the motion candidates from LUTs.
e. Alternatively, the checking process of HMVP candidates will terminate once the number of added motion candidates reaches the maximumly allowed motion candidate numbers. The maximumly allowed motion candidate numbers for the motion candidate list may be signaled or pre-defined. Alternatively, the maximumly allowed motion candidate numbers may further depend on block shape/block size/coded modes etc. al.

Update of Look Up Tables
2. It is proposed that the merge list may be always constructed till a given number of allowed value (denoted by MaxNumConstructedListSize), while the number of allowed merge candidates may be smaller than the MaxNumConstructedListSize.
a. In one example, MaxNumConstructedListSize is set of 6.
b. In one example, indication of the number of allowed merge candidates may be signaled to the decoder, such as in SPS/slice header/picture header/tile group header/video data units.
c. Alternatively, furthermore, the number of allowed merge candidates (e.g., MaxNumMergeCand in the VVC specification) controls the parsing of merge index, but it is decoupled from how many merge candidates shall be constructed in the merge list.
  i. For example, the merge candidate list is always constructed with a fixed size such as MaxNumConstructedListSize, no matter what number of the allowed merge candidates is.
d. In one example, whether to invoke the process of HMVP candidate derivation process may depend on the number of available merge candidates and a given threshold, such as 5.
  i. For example, the process of HMVP candidate derivation process is not invoked if the number of available merge candidates is no smaller than the given threshold.
e. In one example, whether to invoke the process of pairwise averaged candidate derivation process may depend on a given threshold, such as 6.
  i. For example, the process of pairwise averaged candidate derivation process is not invoked if the number of available merge candidates is no smaller than the given threshold.
f. In one example, whether to stop the process of zero motion candidate derivation process may depend on a given threshold, such as 6.
  i. For example, the process of zero candidate derivation process is not invoked if the number of available merge candidates is no smaller than the given threshold.
g. In one example, the merge list may refer to the regular merge list, sub-block merge list, IBC merge list, triangular merge list.
3. The triangular merge list construction process may include two steps: 1) invoking the regular merge list construction process and 2) virtual candidate derivation process.
a. In one example, the whole regular merge list construction process may be invoked.
b. Alternatively, partial of the regular merge list construction process (such as just invoking the process of spatial/temporal/HMVP/pairwise average candidate) may be invoked.
c. In one example, virtual candidate derivation process may be invoked when the number of available regular merge candidates is smaller than the maximum allowed triangular partition mode (TPM) candidates.
d. In one example, the virtual candidates may be derived using techniques described in PCT/CN2018/115183, PCT/CN2019/075856, and PCT/CN2019/079061, all of which are incorporated by reference herein.

ADDITIONAL EXAMPLE EMBODIMENTS

Example Embodiment #1

In this embodiment, whether to invoke the process of HMVP candidate derivation process may depend on the number of available merge candidates and a given threshold (e.g., setting the threshold to be 5 in the example below).

In addition, whether to stop the process of zero motion candidate derivation process may depend on a given threshold (e.g., setting the threshold to be 5 in the example below).

This example embodiment relates to an implementation of some of the disclosed techniques in the context of the VVC codec. This sub-section shows how the current version of the codec standard may be modified for an example implementation. In this sub-section, the section and equation numbers refer to the corresponding section and equation numbers in the current release of the VVC video coding standard.

Further note that deletions are denoted by bolded double square brackets, e.g., [[a]] indicates that "a" is being deleted, and newly added text is bolded underlined text.

8.5.2.2 Derivation Process for Luma Motion Vectors for Merge Mode

This process is only invoked when merge_flag[xCb][yPb] is equal to 1, where (xCb, yCb) specify the top-left sample of the current luma coding block relative to the top-left luma sample of the current picture.

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vectors in 1/16 fractional-sample accuracy mvL0[0][0] and mvL1[0][0], the reference indices refIdxL0 and refIdxL1,
  the prediction list utilization flags predFlagL0[0][0] and predFlagL1[0][0],
  the bi-prediction weight index gbiIdx.

The bi-prediction weight index gbiIdx is set equal to 0.
The variables xSmr, ySmr, smrWidth, smrHeight, and smrNumHmvpCand are derived as follows:

$$xSmr = IsInSmr[xCb][yCb]?SmrX[xCb][yCb]:xCb \quad (8\text{-}276)$$

$$ySmr = IsInSmr[xCb][yCb]?SmrY[xCb][yCb]:yCb \quad (8\text{-}277)$$

$$smrWidth = IsInSmr[xCb][yCb]?SmrW[xCb][yCb]:cbWidth \quad (8\text{-}278)$$

$$smrHeight = IsInSmr[xCb][yCb]?SmrH[xCb][yCb]:cbHeight \quad (8\text{-}279)$$

$$smrNumHmvpCand = IsInSmr[xCb][yCb]?NumHmvpSmrCand:NumHmvpCand \quad (8\text{-}280)$$

The motion vectors mvL0[0][0] and mvL1[0][0], the reference indices refIdxL0 and refIdxL1 and the prediction utilization flags predFlagL0[0] [0] and predFlagL1 [0] [0] are derived by the following ordered steps:

1. The derivation process for merging candidates from neighbouring coding units as specified in clause 8.5.2.3 is invoked with the luma coding block location (xCb, yCb) set equal to (xSmr, ySmr), the luma coding block width cbWidth, and the luma coding block height cbHeight set equal to smrWidth and smrHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, and the bi-prediction weight indices gbiIdx$A_0$, gbiIdx$A_1$, gbiIdx$B_0$, gbiIdx$B_1$, gbiIdx$B_2$.

2. The reference indices, refIdxLXCol, with X being 0 or 1, and the bi-prediction weight index gbiIdxCol for the temporal merging candidate Col are set equal to 0.

3. The derivation process for temporal luma motion vector prediction as specified in in clause 8.5.2.11 is invoked with the luma location (xCb, yCb) set equal to (xSmr, ySmr), the luma coding block width cbWidth, the luma coding block height cbHeight set equal to smrWidth and smrHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

$$availableFlagCol = availableFlagL0Col \quad (8\text{-}281)$$

$$predFlagL0Col = availableFlagL0Col \quad (8\text{-}282)$$

$$predFlagL1Col = 0 \quad (8\text{-}283)$$

4. When tile_group_type is equal to B, the derivation process for temporal luma motion vector prediction as specified in clause 8.5.2.11 is invoked with the luma location (xCb, yCb) set equal to (xSmr, ySmr), the luma coding block width cbWidth, the luma coding block height cbHeight set equal to smrWidth and smrHeight and the variable refIdxL1Col as inputs, and the output being the availability flag availableFlagL1Col and the temporal motion vector mvL1Col. The variables availableFlagCol and predFlagL1Col are derived as follows:

$$availableFlagCol = availableFlagL0Col \,||\, availableFlagL1Col \quad (8\text{-}284)$$

$$predFlagL1Col = availableFlagL1Col \quad (8\text{-}285)$$

5. The merging candidate list, mergeCandList, is constructed as follows:

$i=0$ if(availableFlag$A_1$)

mergeCandList[i++]=$A_1$ if(availableFlag$B_1$)

mergeCandList[i++]=$B_1$ if(availableFlag$B_0$)

mergeCandList[i++]=$B_0$ if(availableFlag$A_0$)

mergeCandList[i++]=$A_0$ if(availableFlag$B_2$)

mergeCandList[i++]=$B_2$ if(availableFlagCol)

$$mergeCandList[i++]=Col \quad (8\text{-}286)$$

6. The variable numCurrMergeCand and numOrigMergeCand are set equal to the number of merging candidates in the mergeCandList.

7. When numCurrMergeCand is less than 5 [[(MaxNumMergeCand−1)]] and smrNumHmvpCand is greater than 0, the following applies:
   The derivation process of history-based merging candidates as specified in 8.5.2.6 is invoked with mergeCandList, isInSmr set equal to IsInSmr[xCb][yCb], and numCurrMergeCand as inputs, and modified mergeCandList and numCurrMergeCand as outputs.
   numOrigMergeCand is set equal to numCurrMergeCand.

8. When numCurrMergeCand is less than MaxNumMergeCand and greater than 1, the following applies:
   The derivation process for pairwise average merging candidate specified in clause 8.5.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, numCurrMergeCand and numOrigMergeCand as inputs, and the output is assigned to mergeCandList, numCurrMergeCand, the reference indices refIdxL0avgCand and refIdxL1avgCand, the prediction list utilization flags predFlagL0avgCand and predFlagL1avgCand and the motion vectors mvL0avgCand and mvL1avgCand of candidate avgCand being added into mergeCandList. The bi-prediction weight index gbiIdx of candidate avgCand being added into mergeCandList is set equal to 0.
   numOrigMergeCand is set equal to numCurrMergeCand.

9. The derivation process for zero motion vector merging candidates specified in clause 8.5.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The bi-prediction weight index gbiIdx of every new candidate zeroCand$_m$ being added into mergeCandList is set equal to 0. The number of candidates being added, numZeroMergeCand, is set equal to (numCurrMergeCand−numOrigMergeCand). When numZeroMergeCand is greater than 0, m ranges from 0 to numZeroMergeCand −1, inclusive.

10. The following assignments are made with N being the candidate at position merge_idx[xCb][yCb] in the merging candidate list mergeCandList (N=mergeCandList[merge_idx[xCb][yCb]]) and X being replaced by 0 or 1:

refIdxLX=refIdxLXN  (8-287)

predFlag$LX$[0][0]=predFlag$LXN$  (8-288)

mvLX[0][0][0]=mvLXN[0]  (8-289)

mvLX[0][0][1]=mvLXN[1]  (8-290)

gbiIdx=gbiIdxN  (8-291)

11. When mmvd_flag[xCb][yCb] is equal to 1, the following applies:
   The derivation process for merge motion vector difference as specified in 8.5.2.7 is invoked with the luma location (xCb, yCb), the luma motion vectors mvL0[0][0], mvL1[0][0], the reference indices refIdxL0, refIdxL1 and the prediction list utilization flags predFlagL0[0][0] and predFlagL1 [0][0] as inputs, and the motion vector differences mMvdL0 and mMvdL1 as outputs.
   The motion vector difference mMvdLX is added to the merge motion vectors mvLX for X being 0 and 1 as follows:

mvLX[0][0][0]+=mMvdLX[0]  (8-292)

mvLX[0][0][1]+=mMvdLX[1]  (8-293)

8.5.2.5 Derivation Process for Zero Motion Vector Merging Candidates

Inputs to this process are:
  a merging candidate list mergeCandList,
  the reference indices refIdxL0N and refIdxL1N of every candidate N in mergeCandList,
  the prediction list utilization flags predFlagL0N and predFlagL1N of every candidate N in mergeCandList,
  the motion vectors mvL0N and mvL1N of every candidate N in mergeCandList,
  the number of elements numCurrMergeCand within mergeCandList.

Outputs of this process are:
  the merging candidate list mergeCandList,
  the number of elements numCurrMergeCand within mergeCandList,
  the reference indices refIdxL0zeroCand$_m$ and refIdxL1zeroCand$_m$ of every new candidate zeroCand$_m$ added into mergeCandList during the invocation of this process,
  the prediction list utilization flags predFlagL0zeroCand$_m$ and predFlagL1zeroCand$_m$ of every new candidate zeroCand$_m$ added into mergeCandList during the invocation of this process,
  the motion vectors mvL0zeroCand$_m$ and mvL1zeroCand$_m$ of every new candidate zeroCand$_m$ added into mergeCandList during the invocation of this process.

The variable numRefIdx is derived as follows:
  If tile_group_type is equal to P, numRefIdx is set equal to NumRefIdxActive[0].
  Otherwise (tile_group_type is equal to B), numRefIdx is set equal to Min(NumRefIdxActive[0], NumRefIdxActive[1]).

When numCurrMergeCand is less than MaxNumMergeCand, the variable numInputMergeCand is set equal to numCurrMergeCand, the variable zeroIdx is set equal to 0 and the following ordered steps are repeated until numCurrMergeCand is equal to 6 [[MaxNumMergeCand]]:

1. For the derivation of the reference indices, the prediction list utilization flags and the motion vectors of the zero motion vector merging candidate, the following applies:
   If tile_group_type is equal to P, the candidate zeroCand$_m$ with m equal to (numCurrMergeCand−numInputMergeCand) is added at the end of mergeCandList, i.e., mergeCandList[numCurrMergeCand] is set equal to zeroCand$_m$, and the reference indices, the prediction list utilization flags and the motion vectors of zeroCand$_m$ are derived as follows and numCurrMergeCand is incremented by 1:

refIdxL0zeroCand$_m$=(zeroIdx<numRefIdx)?zeroIdx:0  (8-335)

refIdxL1zeroCand$_m$=−1  (8-336)

predFlagL0zeroCand$_m$=1  (8-337)

predFlagL1zeroCand$_m$=0  (8-338)

mvL0zeroCand$_m$[0]=0  (8-339)

mvL0zeroCand$_m$[1]=0  (8-340)

mvL1zeroCand$_m$[0]=0  (8-341)

mvL1zeroCand$_m$[1]=0  (8-342)

numCurrMergeCand=numCurrMergeCand+1  (8-343)

Otherwise (tile_group_type is equal to B), the candidate zeroCand$_m$ with m equal to (numCurrMergeCand−numInputMergeCand) is added at the end of mergeCandList, i.e., mergeCandList[numCurrMergeCand] is set equal to zeroCand$_m$, and the reference indices, the prediction list utilization flags and the motion vectors of zeroCand$_m$ are derived as follows and numCurrMergeCand is incremented by 1:

refIdxL0zeroCand$_m$=(zeroIdx<numRefIdx)?zeroIdx:0  (8-344)

refIdxL1zeroCand$_m$=(zeroIdx<numRefIdx)?zeroIdx:0  (8-345)

predFlagL0zeroCand$_m$=1  (8-346)

predFlagL1zeroCand$_m$=1  (8-347)

mvL0zeroCand$_m$[0]=0  (8-348)

mvL0zeroCand$_m$[1]=0  (8-349)

mvL1zeroCand$_m$[0]=0  (8-350)

mvL1zeroCand$_m$[1]=0  (8-351)

numCurrMergeCand=numCurrMergeCand+1  (8-352)

2. The variable zeroIdx is incremented by 1.

Figure 25:
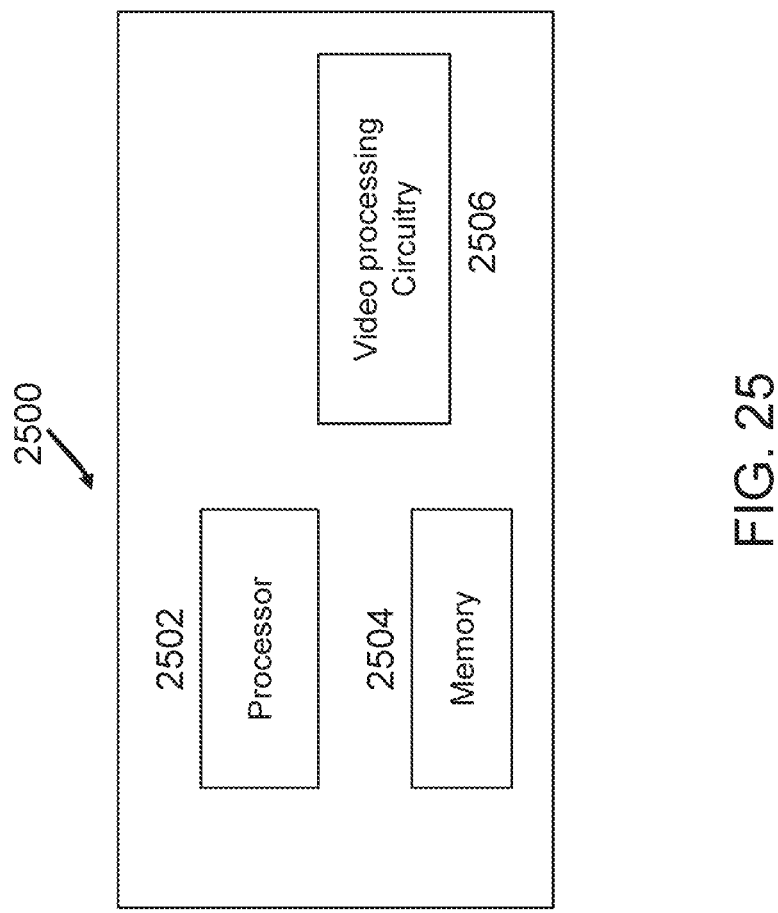
FIG. 25 is a block diagram of an example of a hardware platform for implementing a visual media decoding or a visual media encoding technique described in the present disclosure.

FIG. 25 is a block diagram of a video processing apparatus 2500. The apparatus 2500 may be used to implement one or more of the methods described herein. The apparatus 2500 may be embodied in a smartphone, tablet, computer, Internet of Things (IoT) receiver, and so on. The apparatus 2500 may include one or more processors 2502, one or more memories 2504 and video processing hardware 2506. The processor(s) 2502 may be configured to implement one or more methods described in the present disclosure. The memory (memories) 2504 may be used for storing data and code used for implementing the methods and techniques described herein. The video processing hardware 2506 may be used to implement, in hardware circuitry, some techniques described in the present disclosure.

Figure 26:
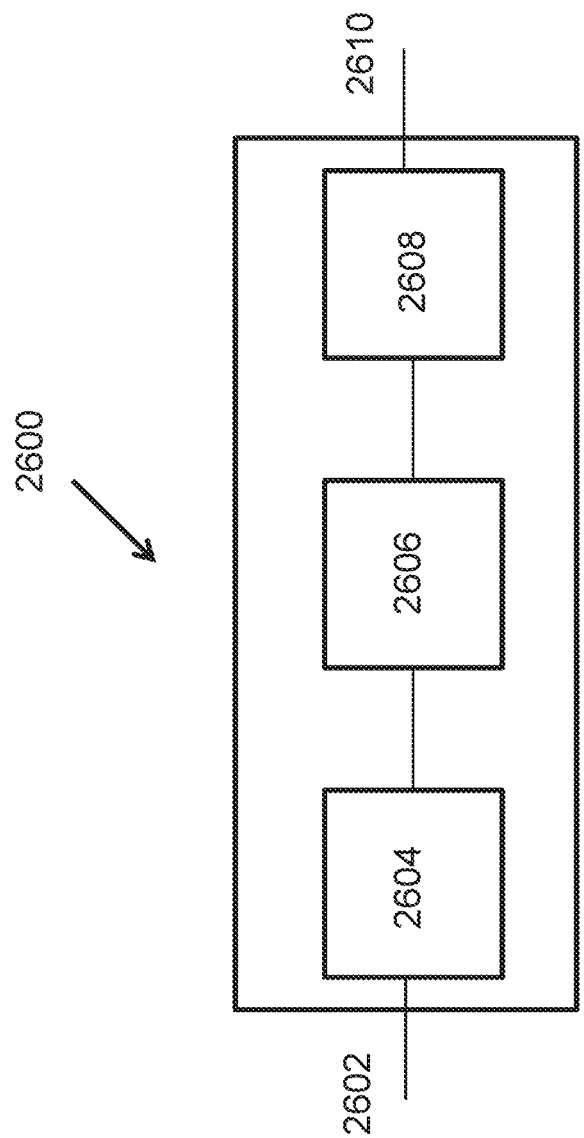
FIG. 26 is a block diagram of an example video processing system in which disclosed techniques may be implemented.

FIG. 26 is a block diagram showing an example video processing system 2600 in which various techniques disclosed herein may be implemented. Various implementations may include some or all of the components of the system 2600. The system 2600 may include input 2602 for receiving video content. The video content may be received in a raw or uncompressed format, e.g., 8 or 10 bit multi-component pixel values, or may be in a compressed or encoded format. The input 2602 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2600 may include a coding component 2604 that may implement the various coding or encoding methods described in the present disclosure. The coding component 2604 may reduce the average bitrate of video from the input 2602 to the output of the coding component 2604 to produce a coded representation of the video. The coding techniques are therefore sometimes called video compression or video transcoding techniques. The output of the coding component 2604 may be either stored, or transmitted via a communication connected, as represented by the component 2606. The stored or communicated bitstream (or coded) representation of the video received at the input 2602 may be used by the component 2608 for generating pixel values or displayable video that is sent to a display interface 2610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 27:
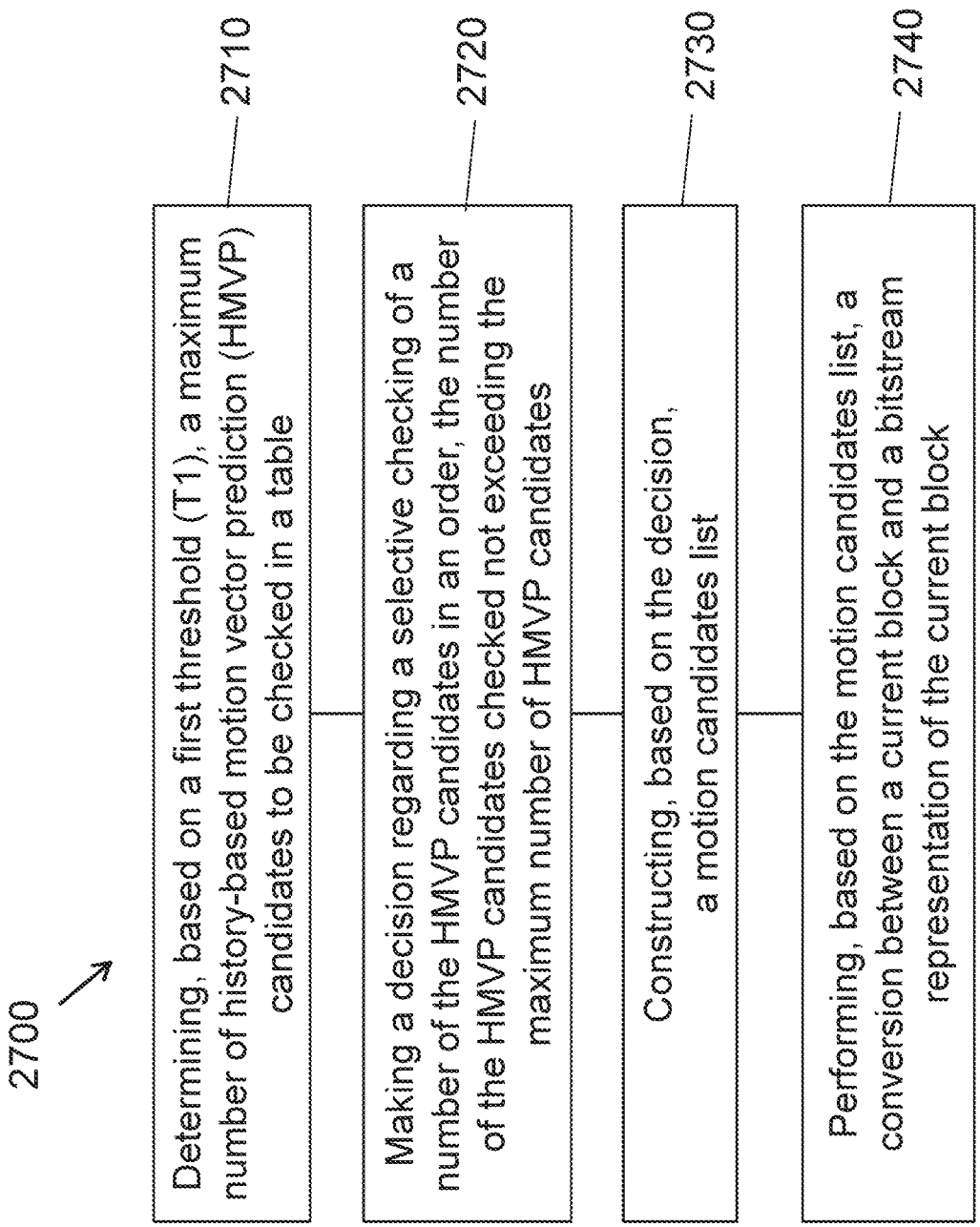
FIG. 27 is a flowchart for an example method for video processing.

FIG. 27 is a flowchart for an example of a video processing method. The method 2700 includes, at operation 2710, determining, based on a first threshold (T1), a maximum number of history-based motion vector prediction (HMVP) candidates to be checked in a table.

The method 2700 further includes, at operation 2720, making a decision regarding a selective checking of a number of the HMVP candidates in an order, the number of the HMVP candidates checked not exceeding the maximum number of HMVP candidates.

The method 2700 further includes, at operation 2730, constructing, based on the decision, a motion candidates list.

The method 2700 further includes, at operation 2740, performing, based on the motion candidates list, a conversion between a current block and a bitstream representation of the current block.

Figure 28:
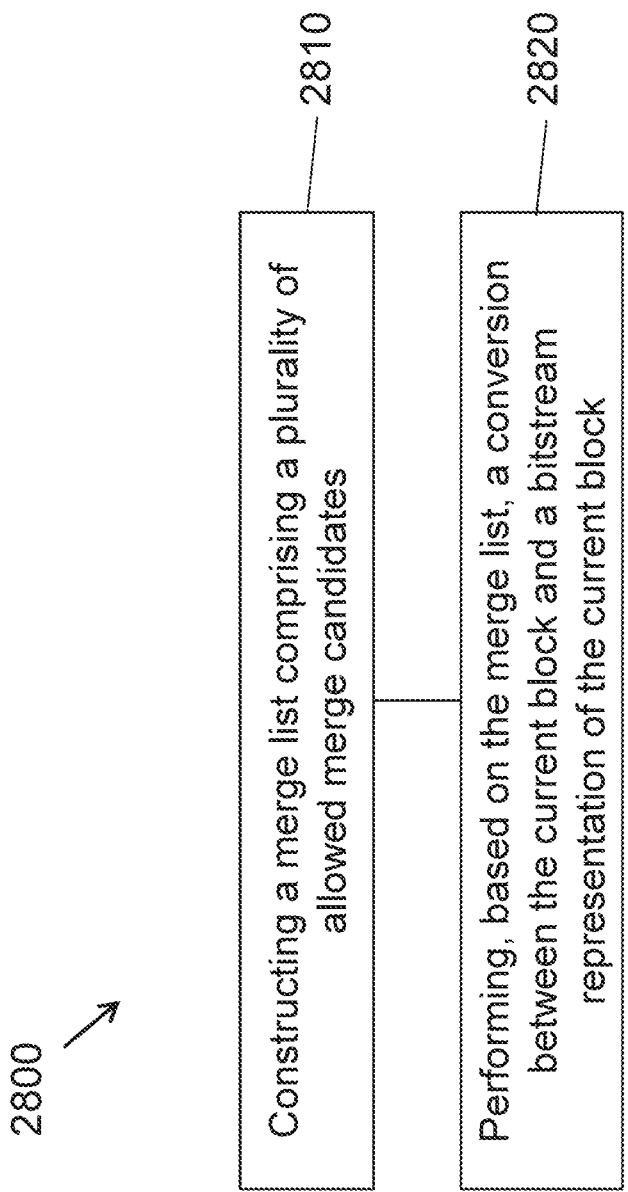
FIG. 28 is a flowchart for another example method for video processing.

FIG. 28 is a flowchart for another example of video processing method. The method 2800 includes, at operation 2810, constructing a merge list comprising a plurality of allowed merge candidates. In some embodiments, a number of the plurality of allowed merge candidates for a current block is smaller than or equal to a maximum list size.

The method 2800 further includes, at operation 2820, performing, based on the merge list, a conversion between the current block and a bitstream representation of the current block.

Figure 29:
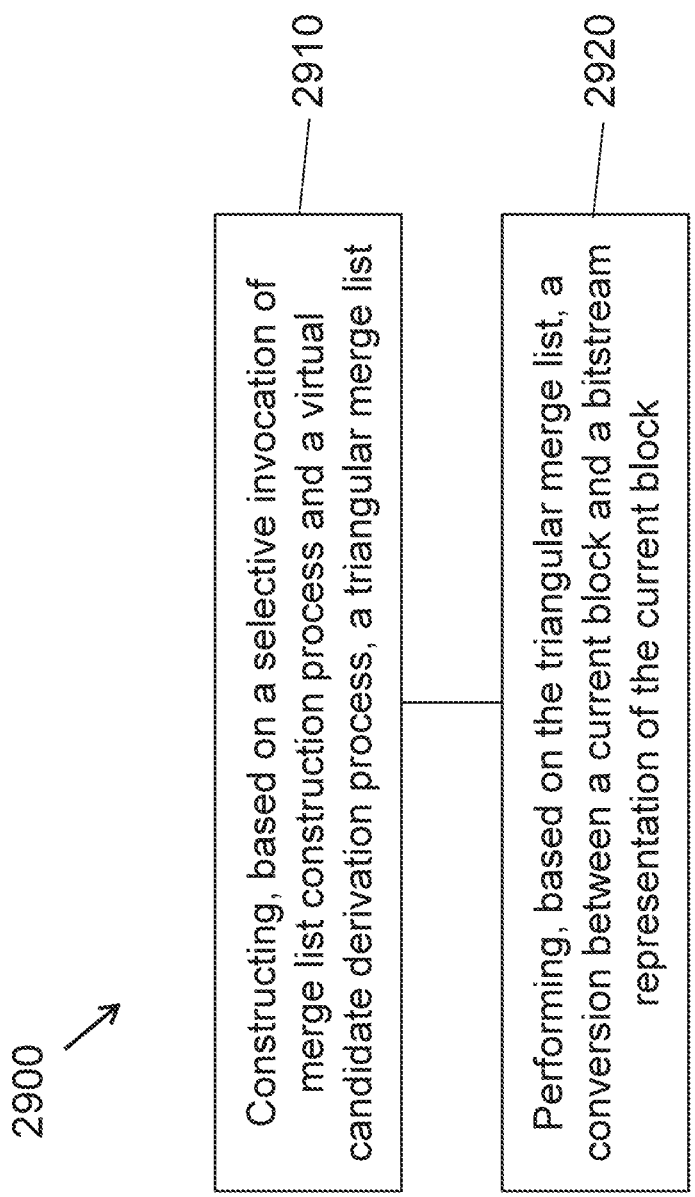
FIG. 29 is a flowchart for yet another example method for video processing.

FIG. 29 is a flowchart for yet another example of video processing method. The method 2900 includes, at operation 2910, constructing, based on a selective invocation of merge list construction process and a virtual candidate derivation process, a triangular merge list.

The method 2900 further includes, at operation 2920, performing, based on the triangular merge list, a conversion between a current block and a bitstream representation of the current block.

In some embodiments, the merge list construction process comprises constructing at least one of a spatial candidate, a temporal candidate, a history-based motion vector prediction (HMVP) candidate or a pairwise averaged candidate, and the virtual candidate derivation process comprises directly copying motion information of one or more merge candidates.

In some embodiments, the following technical solutions be may implemented:

1. A method for video processing, comprising: determining, based on a first threshold (T1), a maximum number of history-based motion vector prediction (HMVP) candidates to be checked in a table; making a decision regarding a selective checking of a number of the HMVP candidates in an order, the number of the HMVP candidates checked not exceeding the maximum number of HMVP candidates; constructing, based on the decision, a motion candidates list; and performing, based on the motion candidates list, a conversion between a current block and a bitstream representation of the current block.

2. The method of solution 1, wherein the maximum number of HMVP candidates to be checked is equal to the first threshold.

3. The method of solution 1 or 2, wherein the first threshold is a variable threshold.

4. The method of solution 1 or 2, wherein the first threshold is pre-determined.

5. The method of any of solutions 2 to 4, wherein T1=5.

6. The method of solution 1, wherein one or more of the HMVP candidates in the table is checked in the order upon a determination that a number of available motion candidates in the motion candidates list, before checking the HMVP candidates, is smaller than the first threshold.

7. The method of solution 1, wherein none of the HMVP candidates in the table is checked upon a determination that a number of available motion candidates in the motion candidates list, before checking the HMVP candidates, is greater than or equal to the first threshold.

8. The method of solution 6 or 7, wherein the number of available motion candidates is determined after at least a pruning operation is applied to motion candidates derived from spatial or temporal neighboring blocks.

9. The method of solution 1, wherein checking the HMVP candidates in the table is terminated upon a determination that a number of available motion candidates in the motion candidates list, including added HMVP candidates, has reached a maximally allowed number of motion candidates.

10. The method of solution 1, wherein checking the HMVP candidates in the table is terminated upon a determination that a number of available motion candidates in the motion candidates list, including added HMVP candidates, has reached a maximally allowed number of motion candidates minus a second threshold (T2).

11. The method of solution 10, wherein T2 is a predefined positive integer.

12. The method of solution 11, wherein T2=1, 2, or 3.

13. The method of solution 11, wherein T2 is configured to be adaptively changed between the current block and a subsequent block.

14. The method of solution 11, wherein T2 is signaled in a sequence parameter set (SPS), a picture parameter set (PPS) or a slice header.

15. The method of solution 11, wherein T2 is based on a shape, size or coding mode of the current block.

16. The method of solution 1, wherein checking the HMVP candidates in the table is terminated upon a determination that a number of added motion candidates has reached a maximally allowed number of motion candidates.

17. The method of solution 16, wherein the maximally allowed number of motion candidates is signaled in the bitstream representation or predefined.

18. The method of solution 16, wherein the maximally allowed number of motion candidates is based on a shape, size or coding mode of the current block.

19. The method of any of solutions 1 to 18, wherein the motion candidates list comprises at least one of a merge or advanced motion vector prediction (AMVP) candidate list.

20. A method for video processing, comprising: constructing a merge list comprising a plurality of allowed merge candidates, wherein a number of the plurality of allowed merge candidates for a current block is smaller than or equal to a maximum list size; and performing, based on the merge list, a conversion between the current block and a bitstream representation of the current block.

21. The method of solution 20, wherein the maximum list size is 6.

22. The method of solution 20, wherein an indication of the number of the plurality of allowed merge candidates is signaled in a sequence parameter set (SPS), a slice header, a picture header, a tile group header or a video data unit.

23. The method of solution 20, wherein parsing a merge index is based on the number of the plurality of allowed merge candidates, and decoupled from the maximum list size.

24. The method of solution 23, wherein a parsed merge index of current block is no greater than the number of the plurality of allowed merge candidates.

25. The method of solution 23, wherein the merge list is constructed based on the maximum list size, and decoupled from the number of the plurality of allowed merge candidates.

26. The method of solution 20, further comprising: making, based on a threshold and a number of available merge candidates in the merge list before checking history-based motion vector prediction (HMVP) candidates, a decision regarding a selective application of an HMVP candidate derivation process.

27. The method of solution 26, wherein the threshold is equal to 5.

28. The method of solution 26 or 27, wherein the HMVP candidate derivation process is not applied when the number of the plurality of allowed merge candidates is no less than the threshold.

29. The method of solution 20, further comprising: making, based on a threshold and a number of available merge candidates in the merge list before invoking a pairwise averaged candidate derivation process, a decision regarding a selective application of the pairwise averaged candidate derivation process.

30. The method of solution 29, wherein the threshold is equal to 6.

31. The method of solution 29 or 30, wherein the pairwise averaged candidate derivation process is not applied when the number of the plurality of allowed merge candidates is no less than the threshold.

32. The method of solution 20, further comprising: making, based on a threshold and a number of available merge candidates, a decision regarding a selective application of a zero motion candidate derivation process.

33. The method of solution 32, wherein the threshold is equal to 6.

34. The method of solution 32 or 33, wherein the zero motion candidate derivation process is not applied when the number of the plurality of allowed merge candidates is no less than the threshold.

35. The method of any of solutions 20 to 34, wherein the merge list comprises a regular merge list, a sub-block merge list, an intra-block copy (IBC) or a triangular merge list.

36. A method for video processing, comprising: constructing, based on a selective invocation of merge list construction process and a virtual candidate derivation process, a triangular merge list; and performing, based on the triangular merge list, a conversion between a current block and a bitstream representation of the current block, wherein the merge list construction process comprises constructing at least one of a spatial candidate, a temporal candidate, a history-based motion vector prediction (HMVP) candidate or a pairwise averaged candidate, and wherein the virtual candidate derivation process comprises directly copying motion information of one or more merge candidates.

37. The method of solution 36, wherein the merge list construction process comprises constructing each of the spatial candidate, the temporal candidate, the HMVP candidate and the pairwise averaged candidate.

38. The method of solution 36, wherein the virtual candidate derivation process is invoked when a number of merge candidates from the merge list construction process is smaller than a maximum number of allowed triangular partitioning mode (TPM) candidates.

39. The method of any of solutions 1 to 38, wherein the conversion generates the current block from the bitstream representation.

40. The method of any of solutions 1 to 38, wherein the conversion generates the bitstream representation from the current block.

41. An apparatus in a video system comprising a processor and a non-transitory memory with instructions thereon, wherein the instructions upon execution by the processor, cause the processor to implement the method in any one of solutions 1 to 40.

42. A computer program product stored on a non-transitory computer readable media, the computer program product including program code for carrying out the method in any one of solutions 1 to 40.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

The disclosed and other embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any embodiment or of what may be claimed, but rather as descriptions of features that may be specific to particular embodiments of particular disclosures. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for video processing, comprising:
    determining a maximum number of history-based motion vector prediction (HMVP) candidates to be checked in an HMVP table, wherein the HMVP table includes one or more HMVP candidates, checked HMVP candidates in the HMVP table are used for determining whether they are added in a motion candidates list, and a maximally allowed number of motion candidates in the HMVP table is equal to a third threshold;
    making a decision regarding a selective checking of a number of the HMVP candidates in the HMVP table in an order, the number of the HMVP candidates checked not exceeding the maximum number of HMVP candidates to be checked in the HMVP table;
    constructing, based on the decision, the motion candidates list; and
    performing, based on the motion candidates list, a conversion between a current block of a video and a bitstream of the video,
    wherein the maximum number of HMVP candidates to be checked in the HMVP table is a variable, and
    wherein checking the HMVP candidates in the HMVP table is terminated upon a determination that a number of available motion candidates in the motion candidates list, including added HMVP candidates, has reached a maximally allowed number of motion candidates in the motion candidates list minus a second threshold (T2), and wherein T2 is configured to adaptively change between the current block and subsequent blocks of the current block of the video.

2. The method of claim 1, wherein T2 is a predefined positive integer.

3. The method of claim 1, wherein the maximally allowed number of motion candidates in the motion candidates list is based on at least one of a shape, size or coding mode of the current block.

4. The method of claim 1, wherein the current block is coded with a motion vector prediction mode, and the motion candidates list comprises a motion vector prediction candidate list.

5. The method of claim 1, wherein the current block is coded with a merge mode and the motion candidates list comprises a merge motion vector candidate list.

6. The method of claim 1, wherein the current block is coded with an intra block copy mode in which prediction sample of the current block is generated by using at least a block vector pointing to another video block in a same picture containing the current block.

7. The method of claim 1, wherein the HMVP table comprises one or more HMVP candidates derived from one or more video blocks that have been coded and indices of the HMVP candidates in the HMVP table are based on a sequence of addition of the HMVP candidates into the HMVP table.

8. The method of claim 1, wherein at least one HMVP candidate is removed from the HMVP table due to addition of a new HMVP candidate into the HMVP table, wherein the at least one HMVP candidate is removed from the HMVP table to provide an empty entry in the HMVP table and HMVP candidates whose indices are greater than that of the at least one HMVP candidate are moved forward to fill the empty entry and the addition of the new HMVP candidate into the HMVP table is performed after the moving of the HMVP candidates.

9. The method of claim 1, wherein the conversion includes encoding the current block into the bitstream.

10. The method of claim 1, wherein the conversion includes decoding the current block from the bitstream.

11. An apparatus for coding video data comprising a processor and a non-transitory memory with instructions thereon, wherein the instructions upon execution by the processor, cause the processor to:
    determine a maximum number of history-based motion vector prediction (HMVP) candidates to be checked in an HMVP table, wherein the HMVP table includes one or more HMVP candidates, checked HMVP candidates in the HMVP table are used for determining whether they are added in a motion candidates list, and a maximally allowed number of motion candidates in the HMVP table is equal to a third threshold;
    make a decision regarding a selective checking of a number of the HMVP candidates in the HMVP table in an order, the number of the HMVP candidates checked not exceeding the maximum number of HMVP candidates to be checked in the HMVP table;
    construct, based on the decision, the motion candidates list; and
    perform, based on the motion candidates list, a conversion between a current block of a video and a bitstream of the video,
    wherein the maximum number of HMVP candidates to be checked in the HMVP table is a variable, and
    wherein checking the HMVP candidates in the HMVP table is terminated upon a determination that a number of available motion candidates in the motion candidates list, including added HMVP candidates, has reached a maximally allowed number of motion candidates in the motion candidates list minus a second threshold (T2), and wherein T2 is configured to adaptively change between the current block and subsequent blocks of the current block of the video.

12. A non-transitory computer-readable storage medium storing instructions that cause a processor to:
    determine a maximum number of history-based motion vector prediction (HMVP) candidates to be checked in an HMVP table, wherein the HMVP table includes one or more HMVP candidates, checked HMVP candidates in the HMVP table are used for determining whether they are added in a motion candidates list, and a maximally allowed number of motion candidates in the HMVP table is equal to a third threshold;
    make a decision regarding a selective checking of a number of the HMVP candidates in the HMVP table in an order, the number of the HMVP candidates checked not exceeding the maximum number of HMVP candidates to be checked in the HMVP table;
    construct, based on the decision, the motion candidates list; and
    perform, based on the motion candidates list, a conversion between a current block of a video and a bitstream of the current block video, wherein the maximum number of HMVP candidates to be checked in the HMVP table is a variable, and wherein checking the HMVP candidates in the HMVP table is terminated upon a determination that a number of available motion candidates in the motion candidates list, including added HMVP candidates, has reached a maximally allowed number of motion candidates in the motion candidates list minus a second threshold (T2), and wherein T2 is configured to adaptively change between the current block and subsequent blocks of the current block of the video.

13. A non-transitory computer-readable recording medium storing a bitstream which is generated by a method performed by a video processing apparatus, wherein the method comprises:

determining a maximum number of history-based motion vector prediction (HMVP) candidates to be checked in an HMVP table, wherein the HMVP table includes one or more HMVP candidates, checked HMVP candidates in the HMVP table are used for determining whether they are added in a motion candidates list, and a maximally allowed number of motion candidates in the HMVP table is equal to a third threshold;

making a decision regarding a selective checking of a number of the HMVP candidates in the HMVP table in an order, the number of the HMVP candidates checked not exceeding the maximum number of HMVP candidates to be checked in the HMVP table;

constructing, based on the decision, the motion candidates list; and generating the bitstream based on the motion candidates list, wherein the maximum number of HMVP candidates to be checked in the HMVP table a variable, and wherein checking the HMVP candidates in the HMVP table is terminated upon a determination that a number of available motion candidates in the motion candidates list, including added HMVP candidates, has reached a maximally allowed number of motion candidates in the motion candidates list minus a second threshold (T2), and wherein T2 is configured to adaptively change between a current block and subsequent blocks of the current block of a video.

14. The apparatus of claim 11, wherein the maximally allowed number of motion candidates in the motion candidates list is based on at least one of a shape, a size, or a coding mode of the current block.

15. The non-transitory computer-readable storage medium of claim 12, wherein the maximally allowed number of motion candidates in the motion candidates list is based on at least one of a shape, a size, or a coding mode of the current block.

16. The apparatus of claim 11, wherein the HMVP table comprises one or more HMVP candidates derived from one or more video blocks that have been coded and indices of the HMVP candidates in the HMVP table are based on a sequence of addition of the HMVP candidates into the HMVP table.

17. The apparatus of claim 11, wherein at least one HMVP candidate is removed from the HMVP table due to addition of a new HMVP candidate into the HMVP table, wherein the at least one HMVP candidate is removed from the HMVP table to provide an empty entry in the HMVP table and HMVP candidates whose indices are greater than that of the at least one HMVP candidate are moved forward to fill the empty entry and the addition of the new HMVP candidate into the HMVP table is performed after the moving of the HMVP candidates.

18. The non-transitory computer-readable storage medium of claim 12, wherein the HMVP table comprises one or more HMVP candidates derived from one or more video blocks that have been coded and indices of the HMVP candidates in the HMVP table are based on a sequence of addition of the HMVP candidates into the HMVP table.

19. The non-transitory computer-readable storage medium of claim 12, wherein at least one HMVP candidate is removed from the HMVP table due to addition of a new HMVP candidate into the HMVP table, wherein the at least one HMVP candidate is removed from the HMVP table to provide an empty entry in the HMVP table and HMVP candidates whose indices are greater than that of the at least one HMVP candidate are moved forward to fill the empty entry and the addition of the new HMVP candidate into the HMVP table is performed after the moving of the HMVP candidates.

20. The non-transitory computer-readable recording medium of claim 13, wherein the maximally allowed number of motion candidates in the motion candidates list is based on at least one of a shape, a size, or a coding mode of the current block.

* * * * *